United States Patent
Go et al.

(10) Patent No.: US 12,119,897 B2
(45) Date of Patent: Oct. 15, 2024

(54) APPARATUS AND METHOD FOR REPORTING CHANNEL STATE INFORMATION IN WIRELESS COMMUNICATION SYSTEM

(71) Applicant: LG ELECTRONICS INC., Seoul (KR)

(72) Inventors: Seongwon Go, Seoul (KR); Jonghyun Park, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 372 days.

(21) Appl. No.: 17/594,285

(22) PCT Filed: Apr. 8, 2020

(86) PCT No.: PCT/KR2020/004745
§ 371 (c)(1),
(2) Date: Oct. 8, 2021

(87) PCT Pub. No.: WO2020/209597
PCT Pub. Date: Oct. 15, 2020

(65) Prior Publication Data
US 2022/0166468 A1    May 26, 2022

Related U.S. Application Data

(60) Provisional application No. 62/831,174, filed on Apr. 8, 2019.

(51) Int. Cl.
H04B 7/0417    (2017.01)
H04B 7/06    (2006.01)

(52) U.S. Cl.
CPC ........ *H04B 7/0417* (2013.01); *H04B 7/0617* (2013.01); *H04B 7/0626* (2013.01); *H04B 7/0695* (2013.01)

(58) Field of Classification Search
CPC .. H04B 7/0417; H04B 7/0617; H04B 7/0626; H04B 7/0695; H04B 7/0456;
(Continued)

(56) References Cited

U.S. PATENT DOCUMENTS

| | | | |
|---|---|---|---|
| 9,774,426 B2 * | 9/2017 | Seo ........................ | H04L 1/0027 |
| 2017/0078011 A1 * | 3/2017 | Kim ....................... | H04W 72/20 |

(Continued)

OTHER PUBLICATIONS

Lenovo, Motorola Mobility, Discussion of multi-beam operation, 3GPP TSG RAN WG1 #96, R1-1902162 , Feb. 25-Mar. 1, 2019, entire pages. (Year: 2019).*

(Continued)

*Primary Examiner* — Ayaz R Sheikh
*Assistant Examiner* — Mang Boi Thawng
(74) *Attorney, Agent, or Firm* — LEE, HONG, DEGERMAN, KANG & WAIMEY

(57) ABSTRACT

A method for reporting channel state information (CSI) performed by a UE in a wireless communication system according to an embodiment of the present disclosure includes transmitting UE capability information related to a plurality of panels, receiving configuration information related to reporting of CSI, receiving a downlink reference signal (DL RS) based on the configuration information, and transmitting CSI related to a measurement result for the DL RS.

12 Claims, 20 Drawing Sheets

(58) Field of Classification Search
CPC .. H04B 7/0628; H04B 7/0404; H04B 7/0691; H04B 7/06966; H04L 5/00
See application file for complete search history.

(56) References Cited

U.S. PATENT DOCUMENTS

| | | | |
|---|---|---|---|
| 2018/0062724 A1 | 3/2018 | Onggosanusi et al. | |
| 2018/0102817 A1* | 4/2018 | Park | H04B 7/0417 |
| 2019/0222289 A1* | 7/2019 | John Wilson | H04W 72/046 |
| 2019/0297519 A1* | 9/2019 | Han | H04B 7/024 |
| 2020/0076490 A1* | 3/2020 | Onggosanusi | H04L 5/0053 |
| 2021/0084640 A1* | 3/2021 | Kang | H04L 5/0048 |
| 2022/0022207 A1* | 1/2022 | Matsumura | H04W 72/54 |
| 2023/0123975 A1* | 4/2023 | Zhang | H04W 56/001 370/329 |

OTHER PUBLICATIONS

Nokia, Nokia Shanghai Bell, Enhancements on Multi-beam Operation, 3GPP TSG RAN WG1 Meeting #96, R1-1902564, Feb. 25-Mar. 1, 2019, entire pages. (Year: 2019).*
3GPP TSG RAN WG1 #96, CMCC, "Enhancements on a multi-beam operation", R1-1902339 (Year: 2019).*
PCT International Application No. PCT/KR2020/004745 International Search Report dated Jul. 23, 2020, 5 pages.
Lenovo et al., "Discussion of multi-beam operation," 3GPP TSG RAN WG1 Meeting #96, R1-1902162, Feb.-Mar. 2019, 7 pages.
Nokia et al., "Enhancements on Multi-beam Operation," 3GPP TSG RAN WG1 Meeting #96, R1-1902564, Feb.-Mar. 2019, 19 pages.
NTT Docomo Inc., "Discussion of multi-beam enhancement," 3GPP TSG RAN WG1 #96bis, R1-1904967, Apr. 2019, 26 pages.
Nokia et al., "Enhancements on Multi-beam Operation," 3GPP TSG RAN WG1 Meeting #96bis Meeting, R1-1905065, Apr. 2019, 18 pages.

* cited by examiner

[FIG. 1]
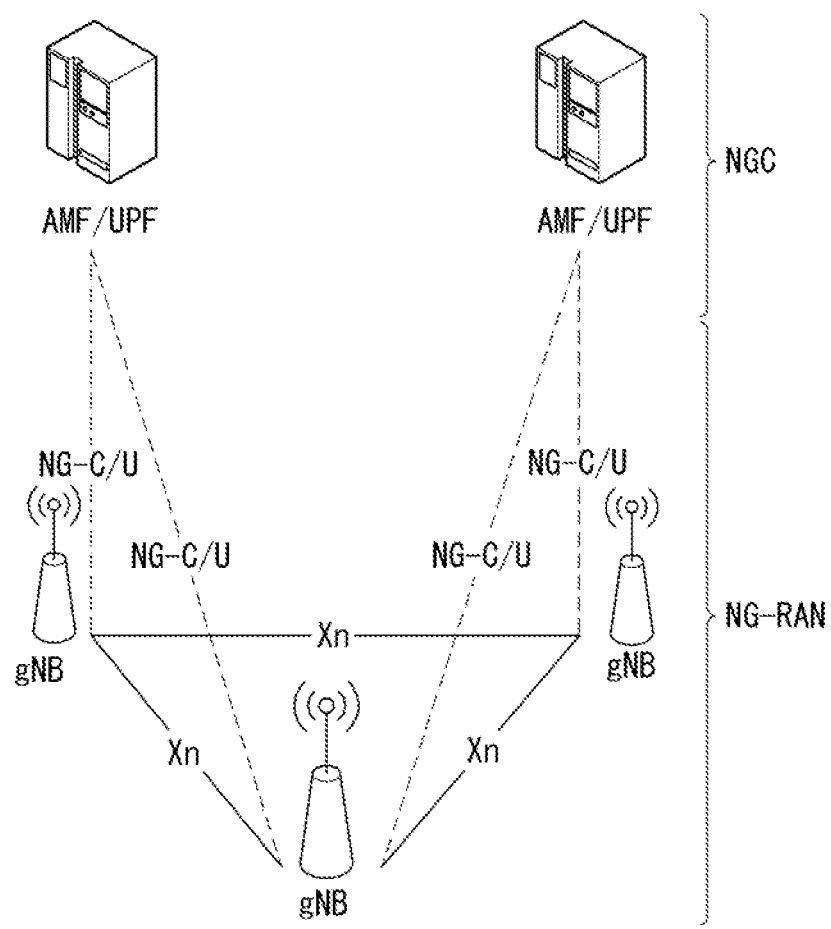

[FIG. 2]
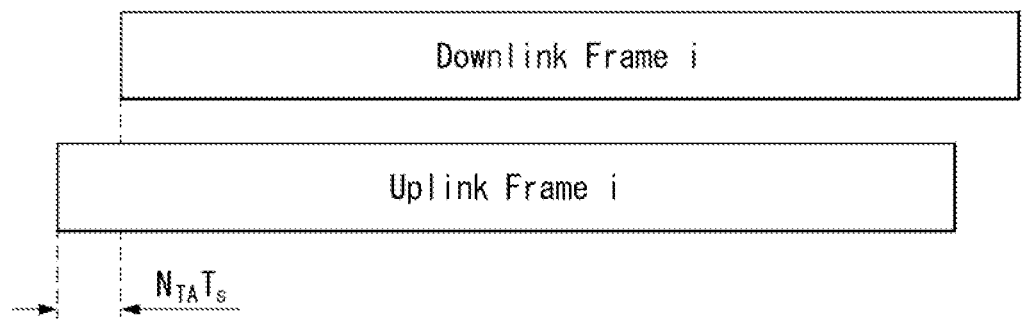

[FIG. 3]
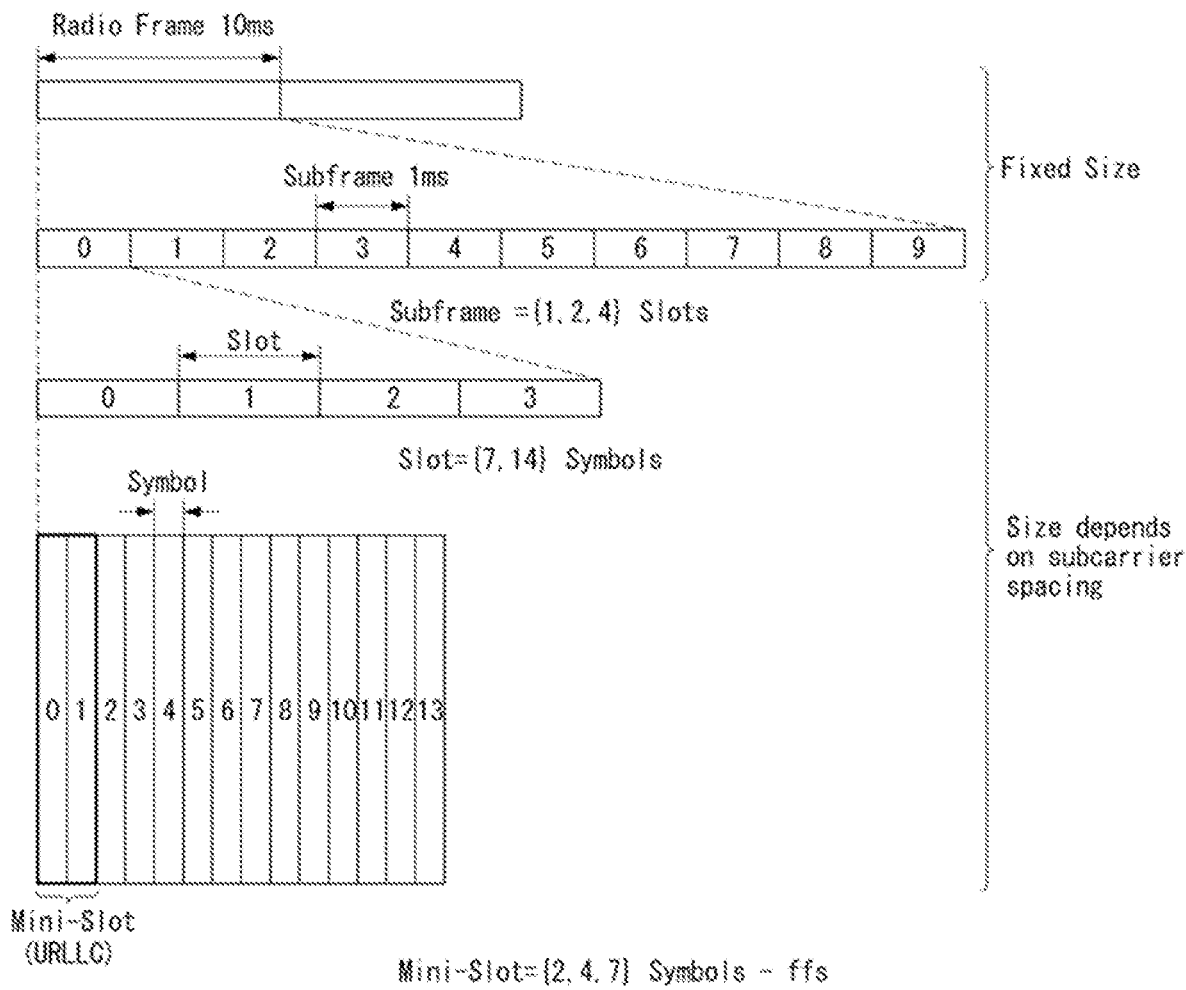

[FIG. 4]
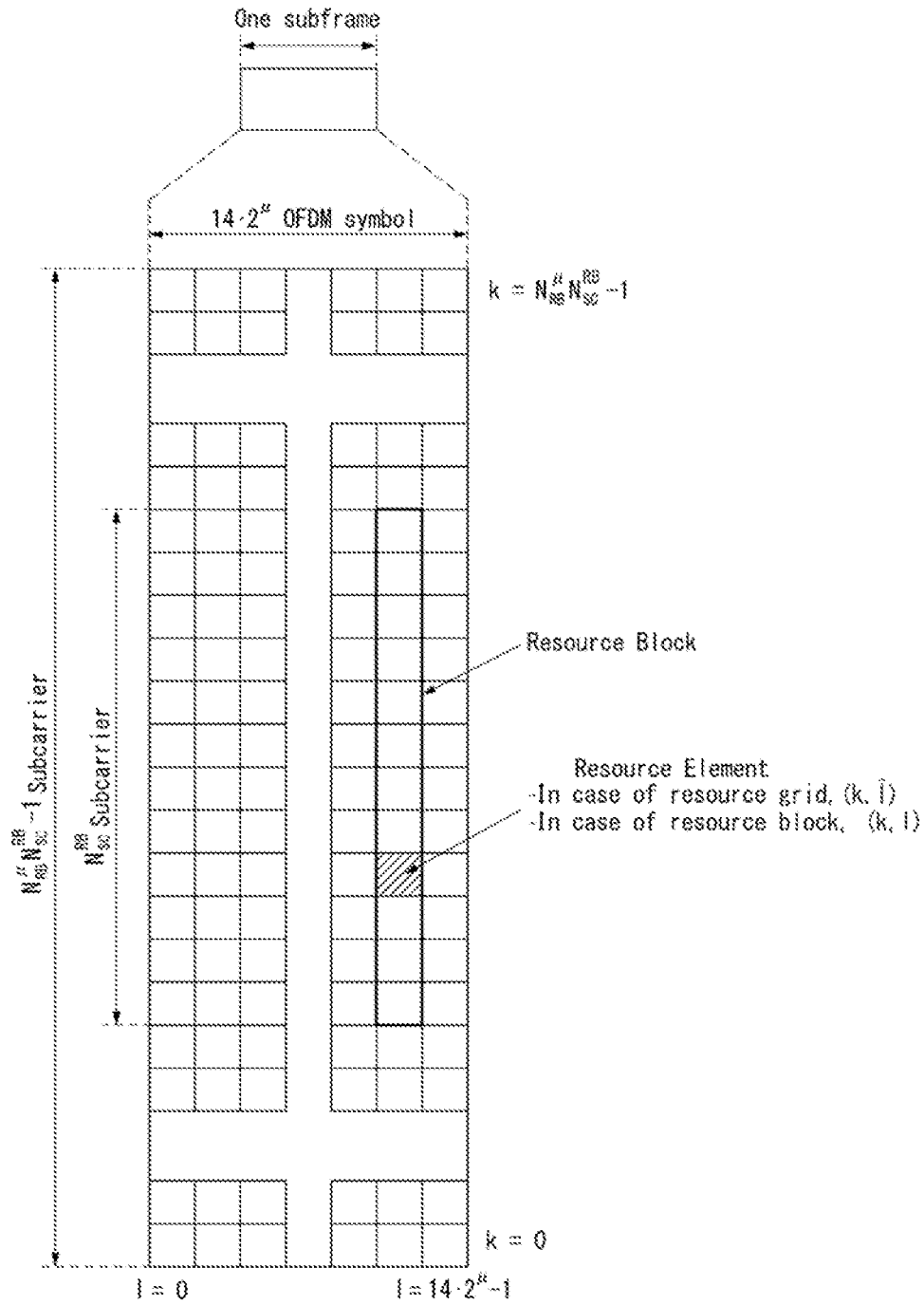

[FIG. 5]
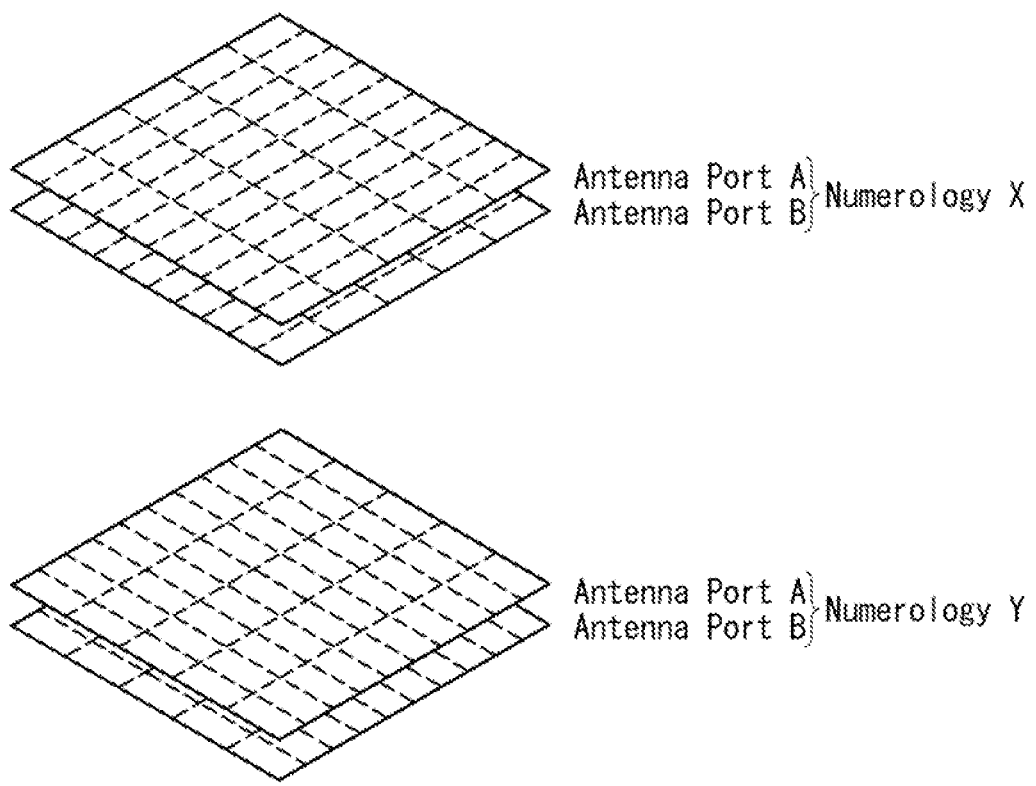

[FIG. 6]
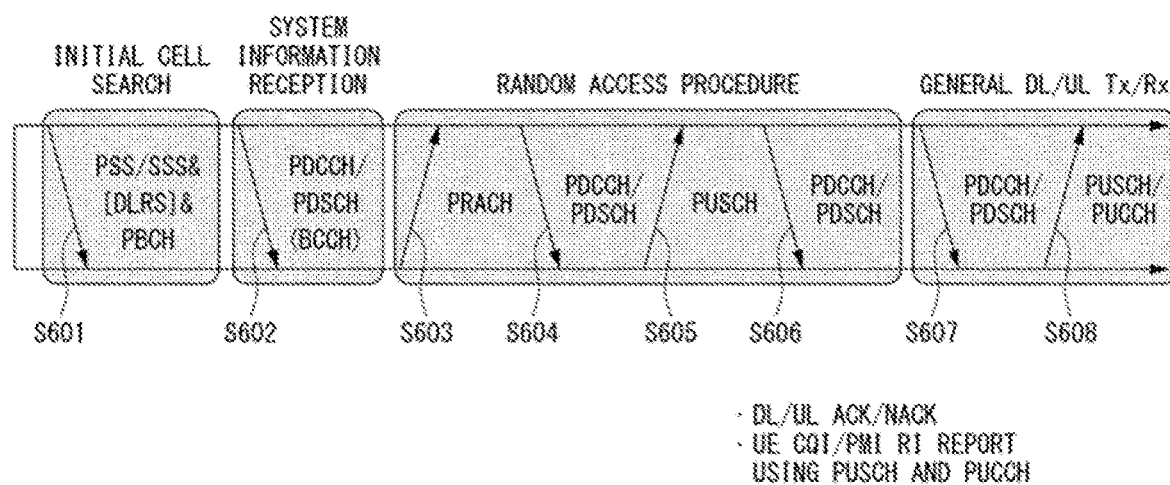

[FIG. 7]
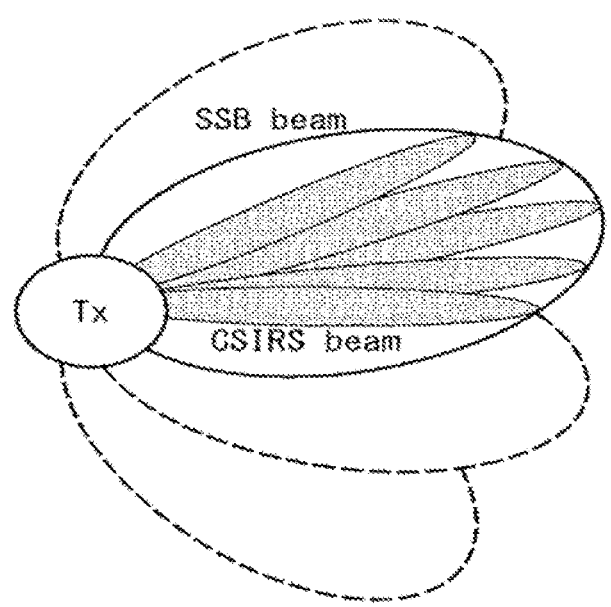

[FIG. 8]
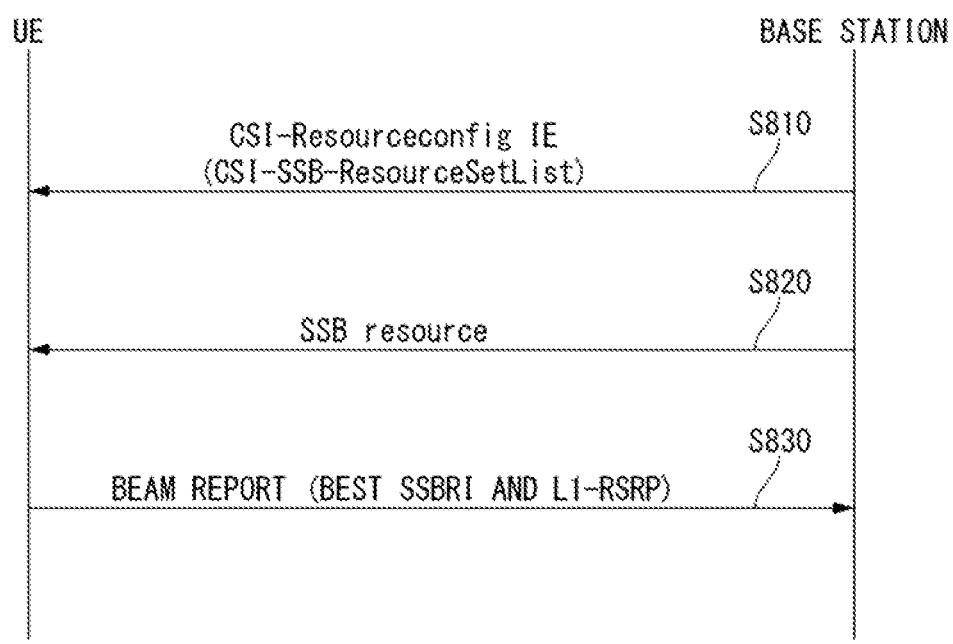

[FIG. 9]
(a)
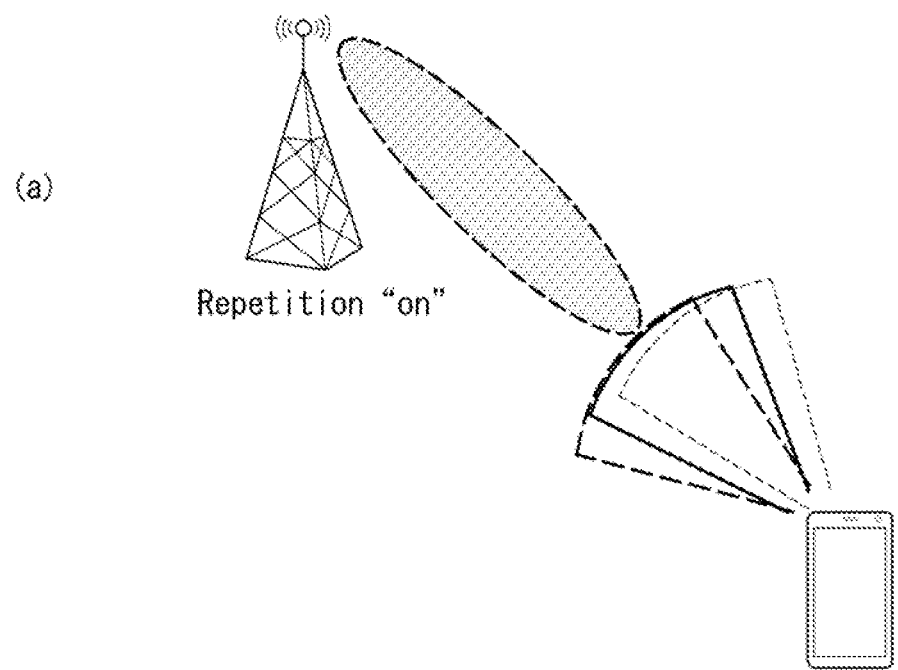
(b)
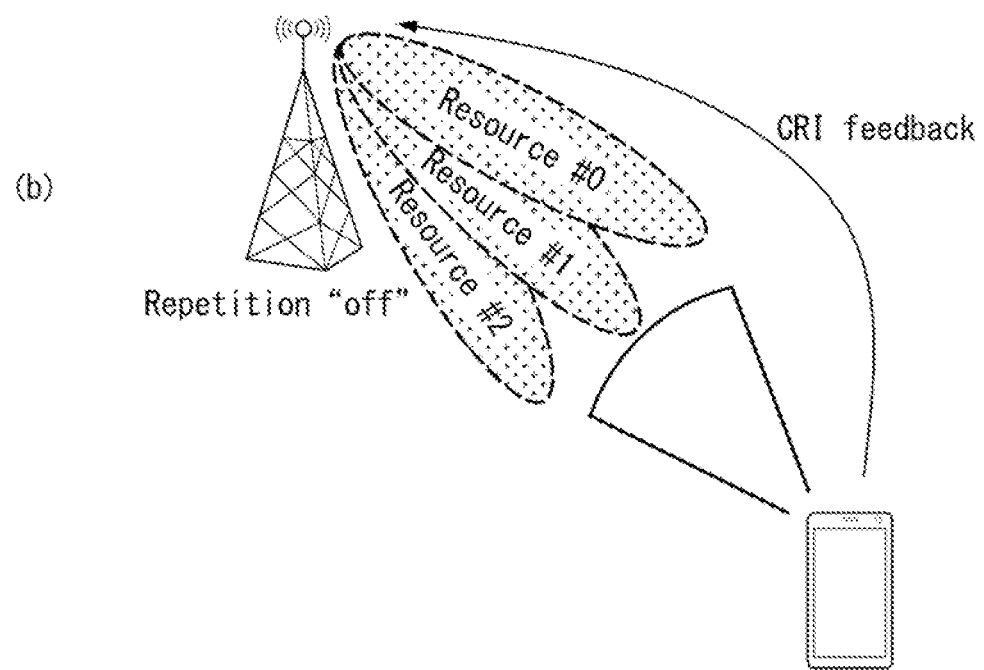

[FIG. 10]
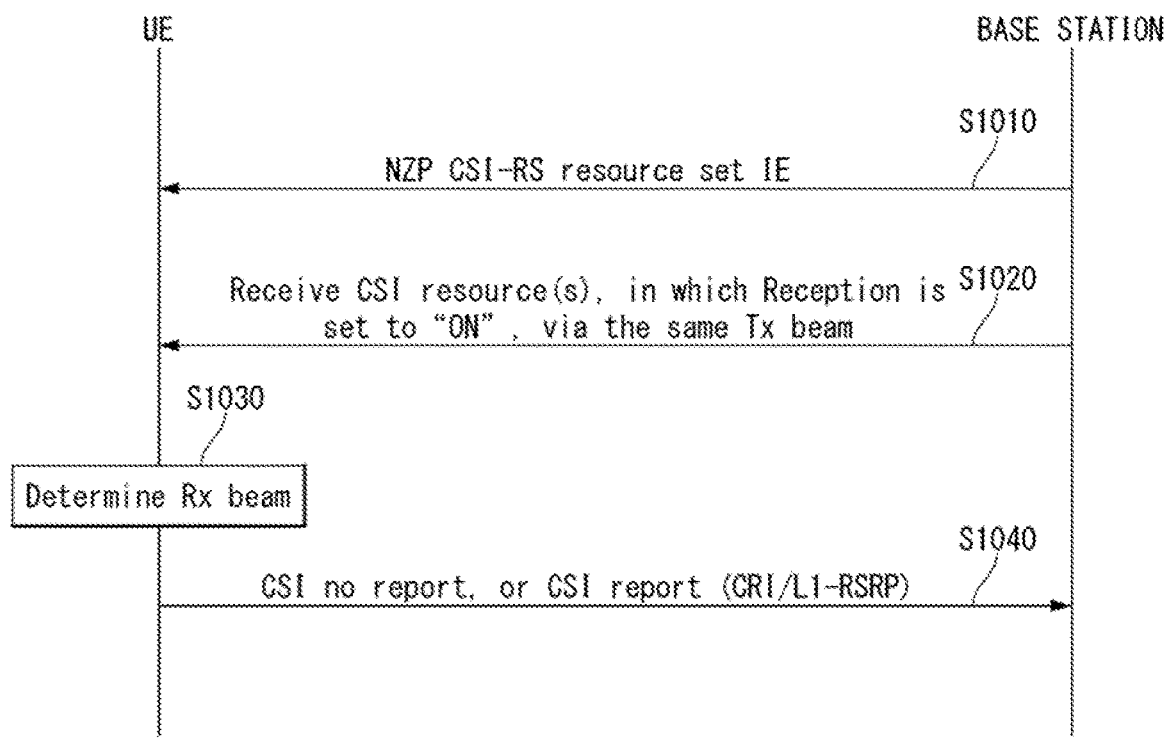

[FIG. 11]
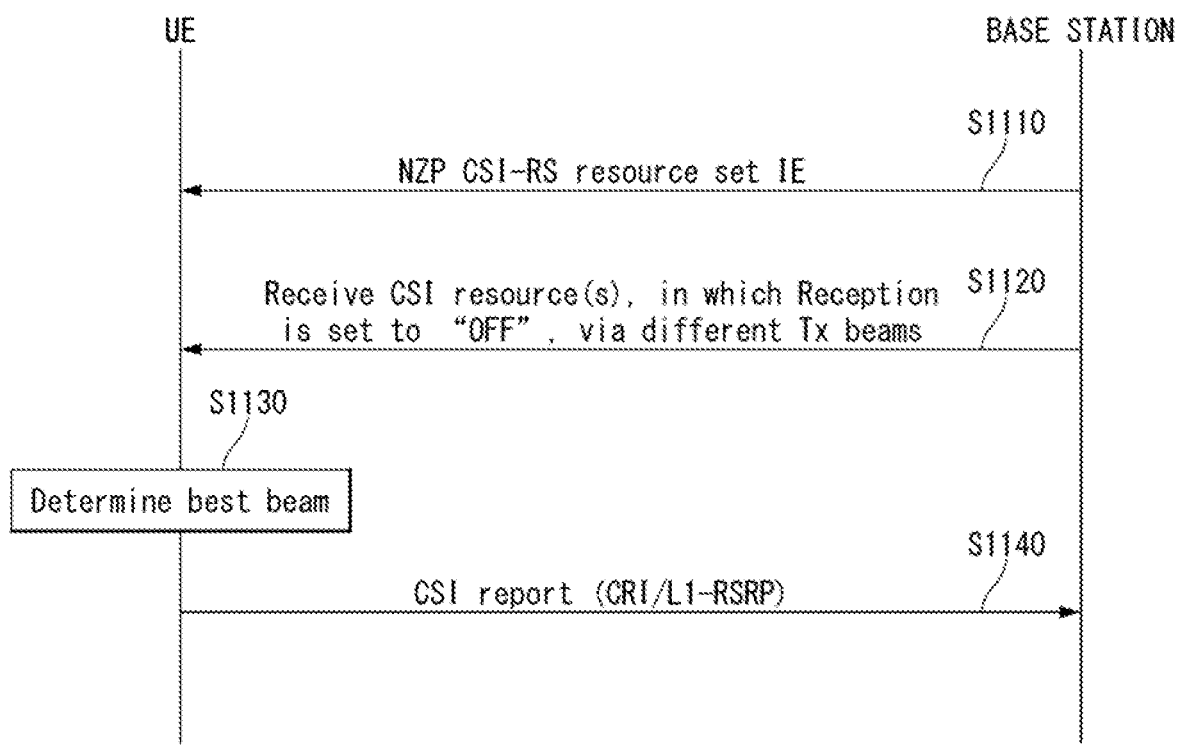

[FIG. 12]
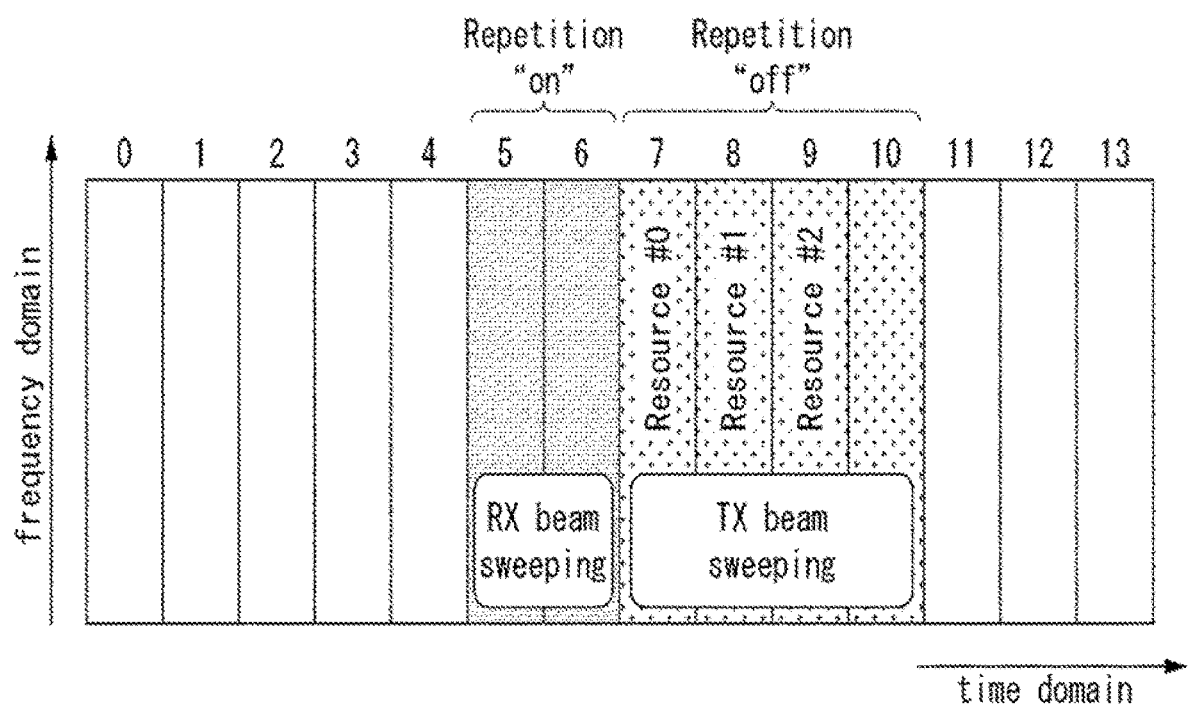

[FIG. 13]
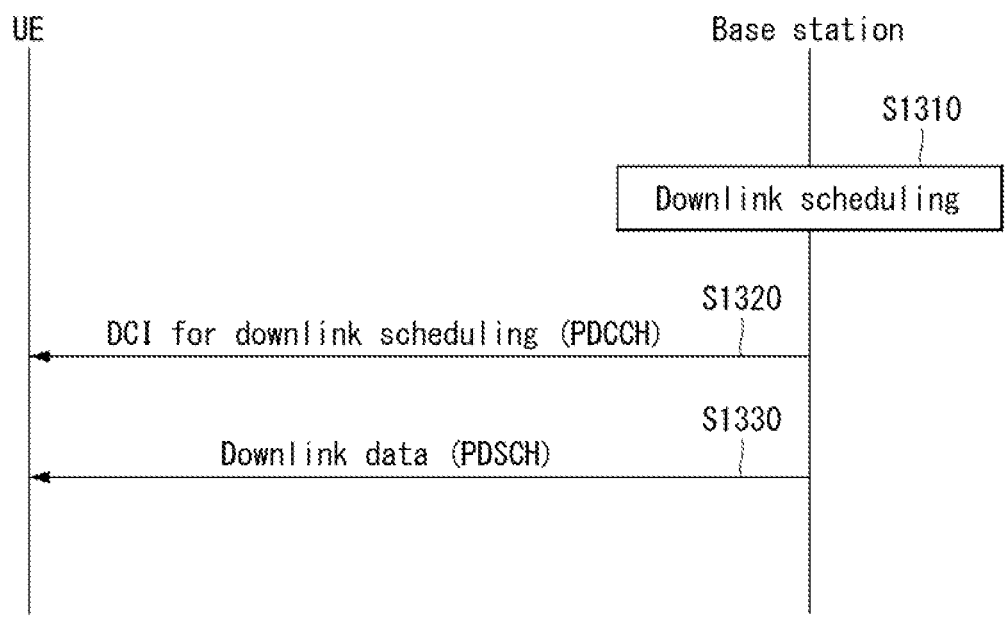

[FIG. 14]
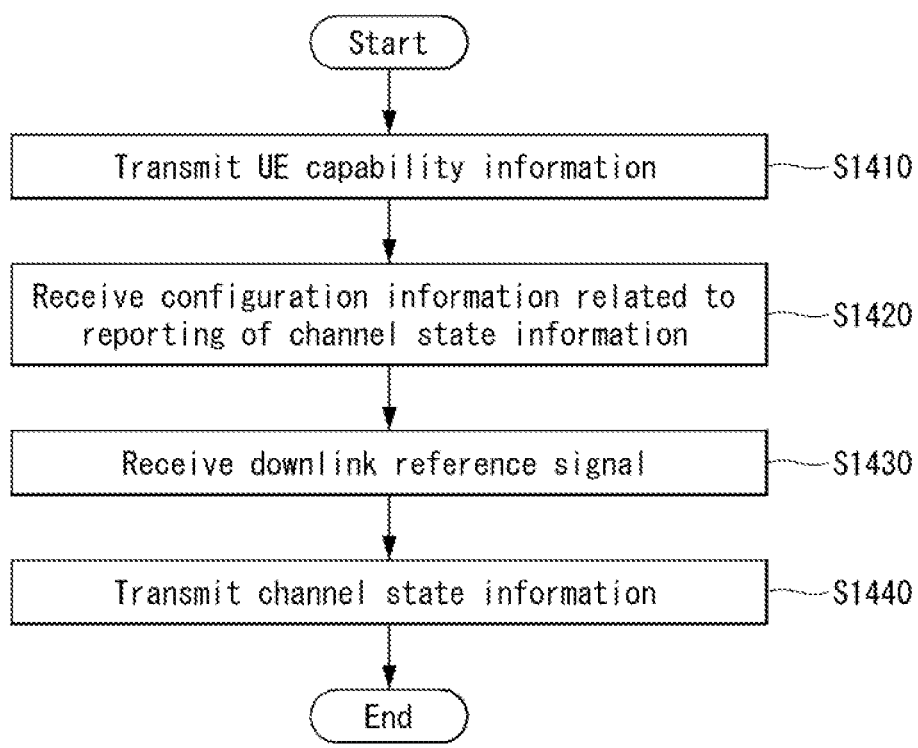

[FIG. 15]
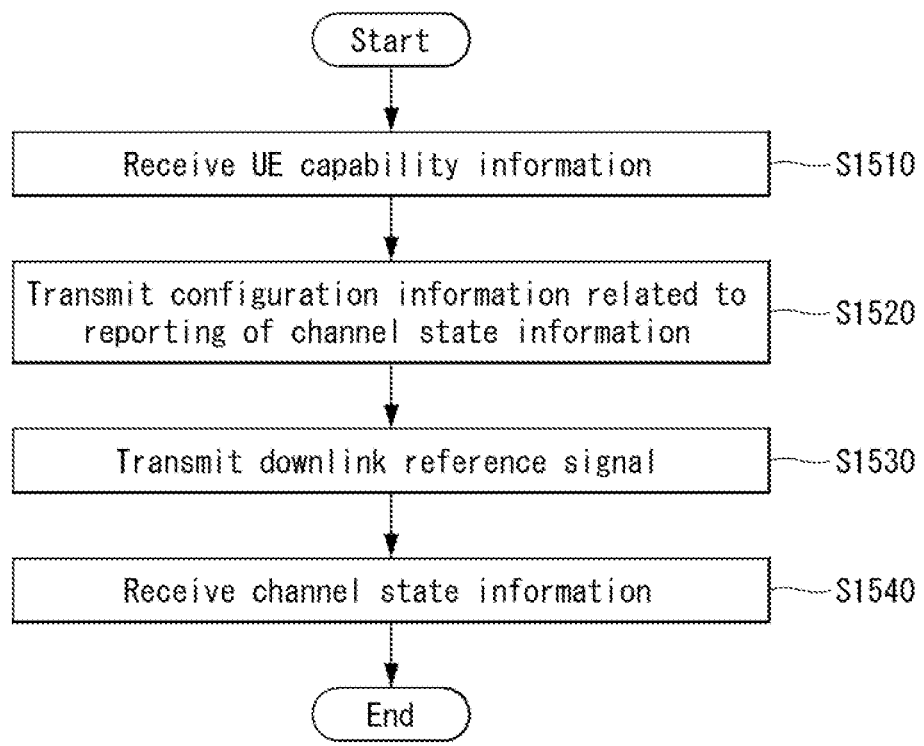

[FIG. 16]
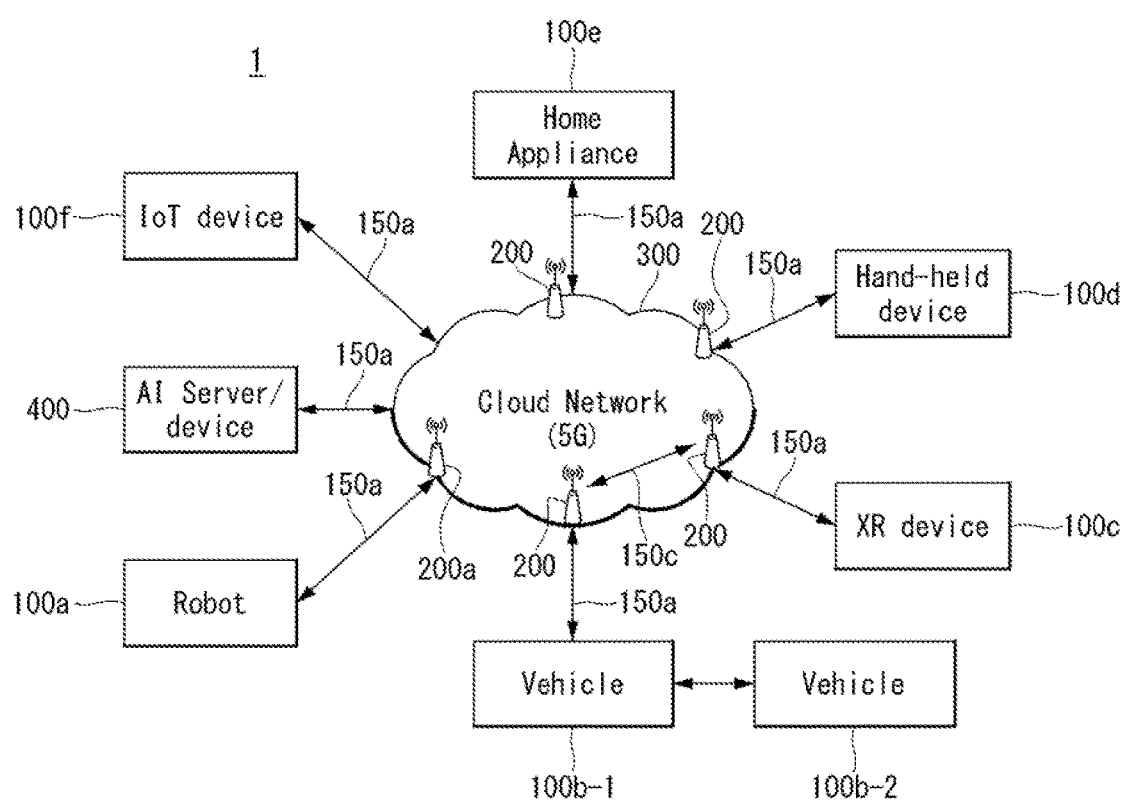

[FIG. 17]
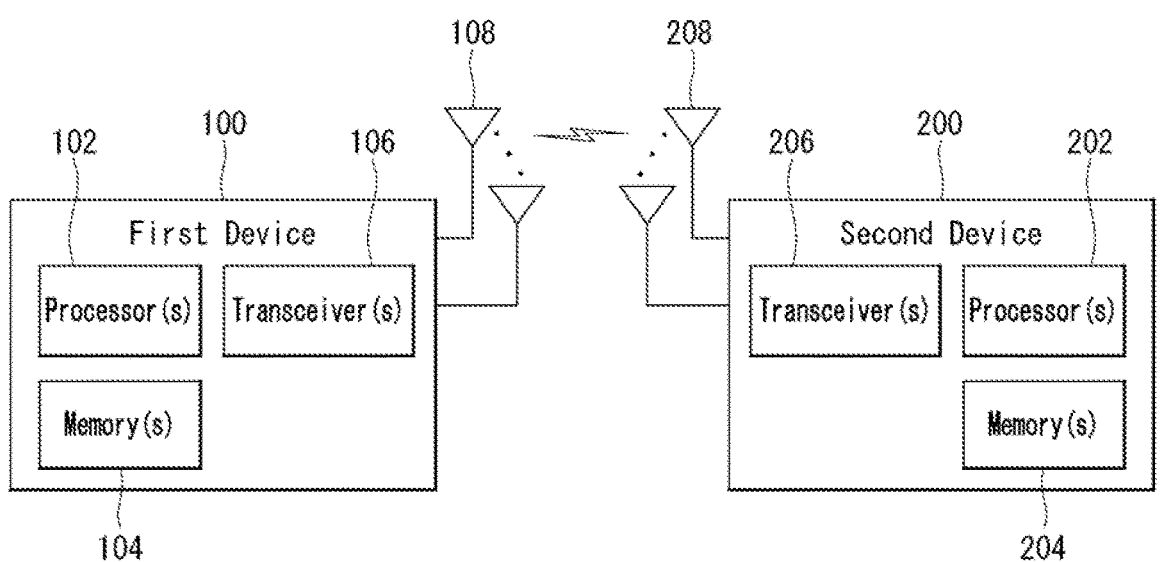

[FIG. 18]
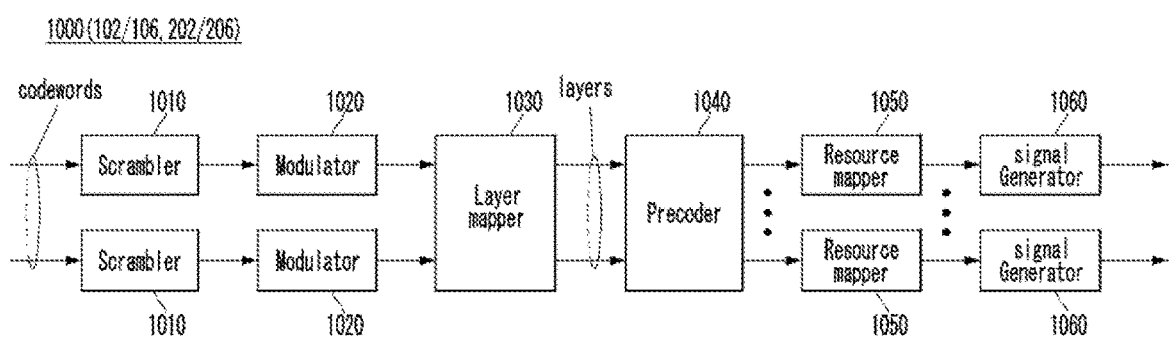

[FIG. 19]
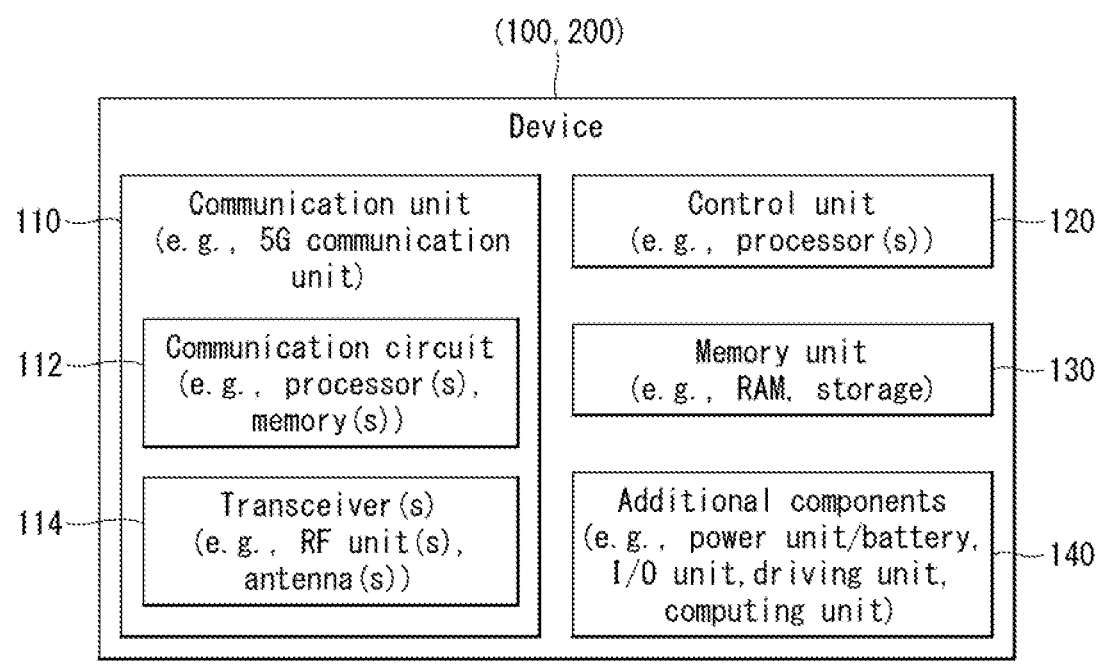

[FIG. 20]
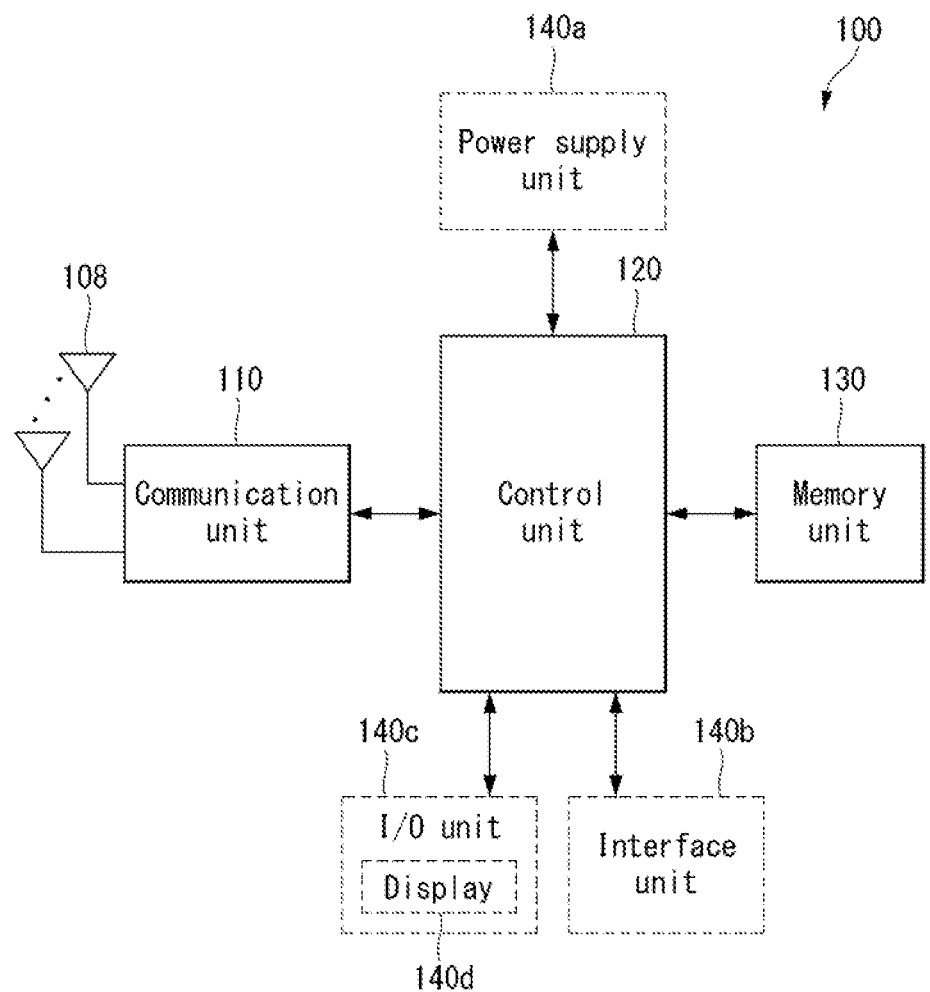

APPARATUS AND METHOD FOR REPORTING CHANNEL STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2020/004745, filed on Apr. 8, 2020, which claims the benefit of U.S. Provisional Application No. 62/831,174, filed on Apr. 8, 2019, the contents of which are all incorporated by reference herein in their entirety.

TECHNICAL FIELD

The present disclosure relates to a method and apparatus for reporting channel state information in a wireless communication system.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to be able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

The present disclosure proposes a method for reporting channel state information. Particularly, the present disclosure proposes a panel-specific channel state information reporting method and a downlink signal transmission/reception method based thereon.

The technical objects of the present disclosure are not limited to the aforementioned technical objects, and other technical objects, which are not mentioned above, will be apparently appreciated by a person having ordinary skill in the art from the following description.

Technical Solution

A method for reporting channel state information (CSI) performed by a UE in a wireless communication system according to an embodiment of the present disclosure includes transmitting UE capability information related to a plurality of panels, receiving configuration information related to reporting of CSI, receiving a downlink reference signal (DL RS) based on the configuration information, and transmitting CSI related to a measurement result for the DL RS.

The measurement result for the DL RS may be based on at least one specific panel among the plurality of panels, and the CSI may include information indicating the at least one specific panel.

The UE capability information may include information related to beam correspondence.

The information related to the beam correspondence may be related to at least one of whether the beam correspondence is established or an operation related to the beam correspondence.

The configuration information may include information for at least one of at least one DL RS resource or a panel ID related to the DL RS resource.

The specific panel may be based on any one of panel IDs mapped to the plurality of panels.

The CSI may include a panel ID related to the specific panel, and the panel ID may be based on a panel ID included in the configuration information or a panel ID excluded from the configuration information.

Based on that the CSI is related to initial reporting, the panel ID included in the CSI may be based on a panel ID included in the configuration information.

Based on that the CSI is related to subsequent reporting, the panel ID included in the CSI may be based on a panel ID included in the configuration information or a panel ID excluded from the configuration information.

The subsequent reporting may be related to at least one of reporting after the initial report, update of the configuration information through medium access control-control element (MAC-CE) signaling, or RRC reconfiguration.

The method may further include receiving information related to a transmission configuration indicator (TCI), and receiving a downlink signal based on the information related to the TCI, wherein the information related to the TCI may be related to the channel state information.

The information related to the TCI may include panel information related to reception of the downlink signal.

The downlink signal may include an SS block, a channel state information reference signal (CSI-RS), a physical downlink control channel (PDCCH) or a physical downlink shared channel (PDSCH).

The downlink signal may be related to at least one of radio resource management (RRM), radio link monitoring (RLM), beam failure recovery (BFR), or tracking for time-frequency synchronization.

The panel information may be related to a demodulation reference signal (DMRS) of the PDCCH or the PDSCH.

A UE reporting channel state information (CSI) in a wireless communication system according to another embodiment of the present disclosure includes one or more transceivers, one or more processors, and one or more memories operatively connectable to the one or more processors and storing instructions for performing operations when reporting of CSI is executed by the one or more processors.

The operations include transmitting UE capability information related to a plurality of panels, receiving configuration information related to reporting of CSI, receiving a downlink reference signal (DL RS) based on the configuration information, and transmitting CSI related to a measurement result for the DL RS.

The measurement result for the DL RS may be based on at least one specific panel among the plurality of panels, and the CSI may include information indicating the at least one specific panel.

An apparatus according to another embodiment of the present disclosure includes one or more memories and one or more processor functionally connected to the one or more memories.

The one or more processors are configured to cause the apparatus to transmit UE capability information related to a plurality of panels, to receive configuration information related to reporting of CSI, to receive a downlink reference signal (DL RS) based on the configuration information, and to transmit CSI related to a measurement result for the DL RS.

The measurement result for the DL RS may be based on at least one specific panel among the plurality of panels, and the CSI may include information indicating the at least one specific panel.

One or more non-transitory computer-readable media according to another embodiment of the present disclosure store one or more instructions.

One or more instructions executable by one or more processors are configured to cause a UE to transmit UE capability information related to a plurality of panels, to receive configuration information related to reporting of CSI, to receive a downlink reference signal (DL RS) based on the configuration information, and to transmit CSI related to a measurement result for the DL RS.

The measurement result for the DL RS may be based on at least one specific panel among the plurality of panels, and the CSI may include information indicating the at least one specific panel.

A method for reporting channel state information (CSI) performed by a base station in a wireless communication system according to another embodiment of the present disclosure includes receiving UE capability information related to a plurality of panels, transmitting configuration information related to reporting of CSI, transmitting a downlink reference signal (DL RS) based on the configuration information, and receiving CSI related to a measurement result for the DL RS.

The measurement result for the DL RS may be based on at least one specific panel among the plurality of panels, and the CSI may include information indicating the at least one specific panel.

A base station reporting channel state information (CSI) in a wireless communication system according to another embodiment of the present disclosure includes one or more transceivers, one or more processors, and one or more memories operatively connectable to the one or more processors and storing instructions for performing operations when reporting of CSI is executed by the one or more processors.

The operations include receiving UE capability information related to a plurality of panels, transmitting configuration information related to reporting of CSI, transmitting a downlink reference signal (DL RS) based on the configuration information, and receiving CSI related to a measurement result for the DL RS.

The measurement result for the DL RS may be based on at least one specific panel among the plurality of panels, and the CSI may include information indicating the at least one specific panel.

Advantageous Effects

According to an embodiment of the present disclosure, reporting of channel state information is performed based on UE capability information related to beam correspondence. The CSI includes information indicating at least one specific panel among a plurality of panels of a UE. Therefore, beam reporting of the multi-panel UE can be performed in a panel-specific manner.

According to an embodiment of the present disclosure, the CSI includes any one of panel IDs mapped to the plurality of panels. Specifically, the panel ID included in the CSI may be based on a panel ID included in configuration information related to reporting of the CSI or a panel ID excluded from the configuration information. Since the panel included in the CSI is not limited to a panel according to settings/instruction of a base station, a more optimal panel can be reported according to channel state.

According to an embodiment of the present disclosure, transmission of a downlink signal based on the CSI may be performed. Specifically, the downlink transmission is performed based on information related to a transmission configuration indicator (TCI). The information related to the TCI is related to the CSI and includes panel information related to reception of the downlink signal. Accordingly, procedures related to the downlink signal (e.g., radio resource management (RRM), radio link monitoring (RLM), beam failure recovery (BFR), or tracking for time-frequency synchronization) are performed in a panel-specific manner. Accordingly, the procedures related to the downlink signal can be performed more rapidly and stably.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates physical channels and general signal transmission used in a 3GPP system.

FIG. 7 illustrates an example of beam forming using SSB and CSI-RS.

FIG. 8 is a flowchart for illustrating a downlink beam management procedure using SSB.

FIG. 9 illustrates for illustrating a downlink beam management procedure using CSI-RS.

FIG. 10 is a diagram for explaining a procedure for determining a reception beam in a downlink beam management procedure using CSI-RS.

FIG. 11 is a diagram for explaining a procedure for determining a transmission beam in a downlink beam management procedure using CSI-RS.

FIG. 12 is a diagram for explaining resource allocation in time and frequency domains in a downlink beam management procedure using CSI-RS.

FIG. 13 illustrates an example of downlink transmission/reception operation.

FIG. 14 is a flowchart for explaining a channel state information reporting method performed by a UE in a wireless communication system according to an embodiment of the present disclosure.

FIG. 15 is a flowchart for explaining a channel state information reporting method performed by a base station in a wireless communication system according to another embodiment of the present disclosure.

FIG. 16 illustrates a communication system 1 applied to the present disclosure.

FIG. 17 illustrates a wireless device applicable to the present disclosure.

FIG. 18 illustrates a signal processing circuit for a transmission signal.

FIG. 19 illustrates another example of a wireless device applied to the present disclosure.

FIG. 20 illustrates a portable device applied to the present disclosure.

MODE FOR DISCLOSURE

A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), AR (Augmented Reality) device, VR (Virtual Reality) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, an Unmanned Aerial Vehicle (UAV), AR (Augmented Reality) device, VR (Virtual Reality) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the present disclosure may be referred to for a background art, terms, abbreviations, etc., used for describing the present disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

DEFINITION OF TERMS eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of an NR system to which a method proposed in the present disclosure is applicable.

Referring to FIG. 1, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is 60 kHz or higher therethan, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s = 1/(\Delta f_{max} \cdot N_f)$. In this case, $\Delta f_{max} = 484 \cdot 10^3$ and $N_f = 4096$. DL and UL transmission is configured as a radio frame having a section of $T_f = (\Delta f_{max} N_f/100) \cdot T_s = 10$ ms. The radio frame is composed of ten subframes each having a section of $T_{sf} = (\Delta f_{max} N_f/1000) \cdot T_s = 1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA} = N_{TA} T_s$ before the start of a corresponding downlink frame at the corresponding UE.

Regarding the numerology, slots are numbered in increasing order of $n_s^\mu \in \{0, \ldots, N_{subframe}^{slots,\mu} - 1\}$ within a subframe and are numbered in increasing order of $n_{s,f}^\mu \in \{0, \ldots, N_{subframe}^{slots,\mu} - 1\}$ within a radio frame. One slot consists of consecutive OFDM symbols of $N_{symb}^\mu$, and $N_{symb}^{\mu}$ is determined depending on a numerology used and slot configuration. The start of slots $n_s^{\mu}$ in a subframe is aligned in time with the start of OFDM symbols $n_s^{\mu} N_{symb}^{\mu}$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame, \mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of $\mu=2$, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In relation to physical resources in the NR system, an antenna port, a resource grid, a resource element, a resource block, a carrier part, etc., may be considered.

Hereinafter, the above physical resources that may be considered in the NR system are described in more detail.

First, in relation to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu} N_{sc}^{RB}$ subcarriers on a frequency domain, each subframe consisting of $14 \cdot 2^{\mu}$ OFDM symbols, but the disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology $\mu$ and antenna port p.

FIG. 5 illustrates examples of a resource grid per antenna port and numerology to which a method proposed in the present disclosure is applicable.

Each element of the resource grid for the numerology $\mu$ and the antenna port p is called a resource element and is uniquely identified by an index pair (k, $\bar{l}$), where k=0, . . . , $N_{RB}^{\mu} N_{sc}^{RB}-1$ is an index on a frequency domain, and $\bar{l}=0, \ldots, 2^{\mu} N_{symb}^{(\mu)}-1$ location of a symbol in a subframe. The index pair (k, l) is used to refer to a resource element in a slot, where $l=0, \ldots, N_{symb}^{\mu}-1$.

The resource element (k, $\bar{l}$) for the numerology and the antenna port p corresponds to a complex value $a_{k,\bar{l}}^{(p,\mu)}$. When there is no risk for confusion or when a specific antenna port or numerology is not specified, the indexes p and $\mu$ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration $\mu$.

The center of subcarrier 0 of common resource block 0 for the subcarrier spacing configuration $\mu$ coincides with 'point A'. A common resource block number $n_{CRB}^{\mu}$ in the frequency domain and resource elements (k, l) for the subcarrier spacing configuration $\mu$ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

DL Beam Management (DL BM) Procedure

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using SSB and CSI-RS.

As illustrated in FIG. 7, an SSB beam and a CSI-RS beam may be used for the beam management. A measurement metric is an L1-RSRP for each resource/block. The SSB may be sued for coarse beam management and the CSI-RS may be sued for fine beam management. The SSB may be used for both the Tx beam sweeping and the Rx beam sweeping. The Rx beam sweeping using the SSB may be performed while the UE changes the Rx beam for the same SSBRI across multiple SSB bursts. Here, one SS burst includes one or more SSBs and one SS burst set includes one or more SSB bursts.

1. DL BM Using SSB

FIG. 8 is a flowchart showing an example of a downlink beam management procedure using SSB.

A configuration for beam report using the SSB is performed during a CSI/beam configuration in an RRC connected state (or RRC connected mode).

The UE receives from the eNB CSI-ResourceConfig IE including CSI-SSB-ResourceSetList including SSB resources used for the BM (S810).

Table 5 shows an example of CSI-ResourceConfig IE and as shown in Table 5, a BM configuration using the SSB is not separately defined and the SSB is configured like the CSI-RS resource.

TABLE 5

```
-- ASN1STAR
-- TAG-CSI-RESOURCECONFIG-START
CSI-ResourceConfig : := SEQUENCE {
  csi-ResourceConfigId CSI-ResourceConfigId,
  csi-RS-ResourceSetList CHOICE {
    nzp-CST-RS-SSB SEQUENCE {
      nzp-CSI-RS-ResourceSetList SEQUENCE (SIZE
(1..maxNrofNZP-CSI-RS-ResourceSetsPerConfig)) OF NZP-CSI-RS-ResourceSetId
OPTIONAL,
      csi-SSB-ResourceStList SEQUENCE (SIZE
(1..maxNrofCSI-SSB-RescourceSetsPerConfig)) OF CSI-SSB-ResourceSetIdOPTIONAL
   },
```

TABLE 5-continued

```
    csi-IM-ResourceSetList SEQUENCE (SIZE (1..maxNrofCSI-IM-
ResourceSetsPerConfig)) OF CSI-IM-ResourceSetId
    },
    bwp-Id BWE-Id,
    resourceType ENUMERATED { aperiodic, semiPersistent,
periodic },
    ...
}
-- TAG-CST-NNSOuNCNOONFIGTOANDmON-STOp
-- ASN1STOP
```

In Table 5, csi-SSB-ResourceSetList parameter represents a list of SSB resources used for beam management and reporting in one resource set. Here, SSB resource set may be configured as {SSBx1, SSBx2, SSBx3, SSBx4, . . . }. SSB index may be defined as 0 to 63.

The UE receives from the eNB the SSB resource based on the CSI-SSB-ResourceSetList (S820).

When CSI-RS reportConfig associated with reporting of SSBRI and L1-RSRP is configured, the UE (beam) reports to the eNB best SSBRI and L1-RSRP corresponding thereto (S830).

In other words, when reportQuantity of the CSI-RS reportConfig IE is configured as 'ssb-Index-RSRP', the UE reports to the eNB best SSBRI and L1-RSRP corresponding thereto.

In addition, when the CSI-RS resource is configured in the same OFDM symbol(s) as SSB (SS/PBCH Block) and 'QCL-TypeD' is applicable, the UE may assume that the CSI-RS and the SSB are quasi co-located from the viewpoint of 'QCL-TypeD'.

Here, the QCL TypeD may mean that antenna ports are QCL from the viewpoint of a spatial Rx parameter. When the UE receives a plurality of DL antenna ports having a QCL Type D relationship, the same Rx beam may be applied. Further, the UE does not expect that the CSI-RS is configured in an RE overlapped with the RE of the SSB.

2. DL BM Procedure Using CSI-RS

When the UE receives a configuration of NZP-CSI-RS-ResourceSet with (higher layer parameter) repetition configured to 'ON', the UE may assume that at least one CSI-RS resource in NZP-CSI-RS-ResourceSet is transmitted to the same downlink spatial domain transmission filter.

In other words, at least one CSI-RS resource in NZP-CSI-RS-ResourceSet is transmitted through the same Tx beam.

Here, at least one CSI-RS resource in NZP-CSI-RS-ResourceSet may be transmitted to different OFDM symbols or transmitted in different frequency domain (i.e. through FDM).

When the UE is a multi-panel UE, at least one CSI-RS resource is a target of FDM.

In addition, when the repetition is configured to "ON", it is related to the Rx beam sweeping procedure of the UE.

The UE does not expect that different periodicities are received at periodicityAndOffset in all CSI-RS resources in NZP-CSI-RS-Resourceset.

In addition, when repetition is configured to 'OFF', the UE does not assume that at least one CSI-RS resource in NZP-CSI-RS-ResourceSet is transmitted to the same downlink spatial domain transmission filter.

In other words, at least one CSI-RS resource in NZP-CSI-RS-ResourceSet is transmitted through different Tx beams.

When the repetition is configured to "OFF", it is related to the Tx beam sweeping procedure of the eNB.

In addition, the repetition parameter may be configured only for CSI-RS resource sets associated with CSI-ReportConfig having a report of L1 RSRP or 'No Report (or None)'.

When the UE is configured with CSI-ReportConfig in which reportQuantity is configured as 'cri-RSRP' or 'none', the UE may be configured only with the same number of port (1-port or 2-port) having higher layer parameter 'nrofPorts' for all CSI-RS resources in NZP-CSI-RS-ResourceSet. Here, CSI-ResourceConfig does not include the higher layer parameter "trs-Info" but includes NZP-CSI-RS-ResourceSet configured to the higher layer parameter "repetition" (=ON).

More specifically, with respect to the purpose of the CSI-RS, if parameter repetition is configured and TRS_info is not configured in a specific CSI-RS resourceset, the CSI-RS is used for beam management.

In addition, if parameter repetition is not configured and TRS_info is configured, the CSI-RS is used as a TRS (Tracking Reference Signal).

In addition, if neither parameter repetition nor TRS_info is configured, the CSI-RS is used for CSI acquisition.

FIG. 9 illustrates an example of a downlink beam management procedure using a Channel State Information-Reference Signal (CSI-RS).

(a) of FIG. 9 illustrates an Rx beam determination (or refinement) procedure of the UE and (b) of FIG. 9 illustrates a Tx beam sweeping procedure of the eNB. Further, (b) of FIG. 9 illustrates a case where the repetition parameter is configured to 'ON' and (b) of FIG. 9 illustrates a case where the repetition parameter is configured to 'OFF'.

Referring to (a) of FIG. 9 and FIG. 10, an Rx beam determination process of the UE will be described.

FIG. 10 is a flowchart showing an example of a RX beam determination process of a UE in the DL BM procedure using CSI-RS.

In the FIG. 10, the UE receives, from the eNB, NZP CSI-RS resource set IE including higher layer parameter repetition through RRC signaling (S1010). Here, the repetition parameter is configured to 'ON'.

The UE repeatedly receives a resource(s) in CSI-RS resource set configured as repetition 'ON' in different OFDM symbols through the same Tx beam (or DL spatial domain transmission filter) of the eNB (S1020).

The UE determines the Rx beam thereof (S1030).

The UE may skip a CSI report and transmit a CSI report including CRI/L1-RSRP to the eNB (S1040).

In this case, reportQuantity of CSI report config may be configured as "No report (or None)" or CRI and L1-RSRP".

That is, when repetition is configured to "ON", the UE may skip the CSI report or report ID information (CRI) of a beam pair related priority beam and a quality value (L1-RSRP) thereof.

Referring to (b) of FIG. 9 and FIG. 11, a Tx beam determination process of the eNB will be described.

FIG. 11 is a flowchart showing an example of a TX beam determination process of an eNB.

The UE receives, from the eNB, NZP CSI-RS resource set IE including higher layer parameter repetition through RRC signaling (S1110).

Here, the repetition parameter is configured to 'OFF' and associated with the Tx beam sweeping procedure of the eNB.

The UE receives a resource(s) in CSI-RS resource set configured as repetition 'OFF' through different Tx beams (DL spatial domain transmission filters) of the eNB (S1120).

The UE selects (or determines) a best beam (S1130), and reports to the eNB an ID for the selected beam and related quality information (e.g., L1-RSRP) (S1140).

In this case, reportQuantity of CSI report config may be configured as 'CRI+L1-RSRP'. In other words, when the CSI-RS is transmitted for the BM, the UE reports to the eNB the CRI and L1-RSRP therefor.

FIG. 12 illustrates an example of resource allocation in time and frequency domains associated with an operation of FIG. 9.

Referring to FIG. 12, when repetition 'ON' is configured in the CSI-RS resource set, a plurality of CSI-RS resources is repeatedly used via the same Tx beam. When repetition 'OFF' is configured in the CSI-RS resource set, different CSI-RS resources are transmitted via different Tx beams.

3. DL BM Associated Beam Indication

The UE may be RRC-configured with a list for a maximum of M candidate Transmission Configuration Indication (TCI) states at least for a purpose of Quasi Co-location (QCL) indication. Here, the M may be 64.

Each TCI state may be configured as one RS set. One of DL RS types including SSB, P-CSI RS, SP-CSI RS, A-CSI RS, and the like may be at least referred to for an ID of each DL RS for a purpose of spatial QCL (QCL Type D) in the RS set.

Initialization/update of the ID of the DL RS(s) in the RS set used for the purpose of the spatial QCL may be at least performed through explicit signaling.

Table 6 shows an example of TCI-State IE.

The TCI-State IE is associated with a quasi co-location (QCL) type corresponding to one or two DL reference signals (RSs).

TABLE 6

```
-- ASN1STAR
-- TAG-TCI-STATE-START
TCI-State : :=              SEQUENCE {
    tci-Stateid             TCI-StateId,
    qcl-Type1               QCL-Info,
    qcl-Type2               QCL-Info
    ...
}
QCL-Info : : =              SEQUENCE {
    cell                    ServCellIndex
    bwp-Id                  BWP-Id
    referenceSignal         CHOICE {
        csi-rs              NZP-CSI-RS-ResourceId,
        ssb                 SSB-Index
    },
    qcl-Type                ENUMERATED {typeA, typeB, typeC, typeD},
    ...
}
-- TAG-TCI-STATE-STOP
-- ASN1STOP
```

In Table 6, bwp-Id parameter represents DL BWP in which the RS is located, cell parameter represents a carrier in which the RS is located, and reference signal parameter represents a reference antenna port(s) which becomes a source of quasi co-location for a corresponding target antenna port(s) or a reference signaling including the same. The target antenna port(s) may be CSI-RS, PDCCH DMRS, or PDSCH DMRS. As an example, corresponding TCI state ID may be indicated for NZP CSI-RS resource configuration information in order to indicate QCL reference RS information for NZP CSI-RS. As another example, the TCI state ID may be indicated for each CORESET configuration in order to indicate QCL reference information for a PDCCH DMRS antenna port(s). As yet another example, the TCI state ID may be indicated through DCI in order to indicate QCL reference information for a PDSCH DMRS antenna port(s).

4. QCL (Quasi-Co Location)

The antenna port is defined so that a channel in which the symbol on the antenna port is transported may be inferred from a channel in which different symbols on the same antenna port are transported. When a property of a channel in which a symbol on one antenna port is transported may be interred from a channel in which symbols on different antenna ports are transported, two antenna ports may have a quasi co-located or quasi co-location (QC/QCL) relationship.

Here, the channel property includes at least one of a delay spread, a Doppler spread, a frequency/Doppler shift, average received power, received timing/average delay, and a spatial Rx parameter. Here, the spatial Rx parameter means a spatial (receive) channel property parameter such as angle of arrival.

The UE may be configured as a list of up to M TCI-State configurations in higher layer parameter PDSCH-Config in order to decode the PDSCH according to detected PDCCH having an intended DCI for the corresponding UE and a given serving cell. The M depends on a UE capability.

Each TCI-State includes a parameter for configuring a quasi co-location relationship between one or two DL reference signals and a DM-RS port of the PDSCH.

The quasi co-location relationship is configured as higher layer parameter qcl-Type1 for a first DL RS and qcl-Type2 (when configured) for a second DL RS. Two DL RSs are not the same as each other in terms of QCL type regardless of whether two DL RS are DL RSs having the same reference or DL RSs having different references.

A quasi co-location type corresponding to each DL RS may be given by higher layer parameter qcl-Type of QCL-Info and may take one of the following values.
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

For example, when a target antenna port is specific NZP CSI-RS, corresponding NZP CSI-RS antenna ports may be indicated/configured to be QCL with specific TRS from the viewpoint of QCL-Type A and specific SSB from the viewpoint of QCL-Type D. The UE that receives the indication/configuration may receive the corresponding NZP CSI-RS by using a Doppler delay value measured in QCL-TypeA TRS and apply an Rx beam used for receiving QCL-TypeD SSB to reception of the corresponding NZP CSI-RS.

The UE may receive an activation command by MAC CE signaling used for mapping up to eight TCI states to codepoint of DCI field "Transmission Configuration Indication'.

UL BM Procedure

In the case of UL BM, beam reciprocity (or beam correspondence) between the Tx beam and the Rx beam may be established or not established according to UE implementation. If the reciprocity between the Tx beam and the Tx beam is established in both the eNB and the UE, a UL beam pair may be matched through a DL beam pair. However, when the reciprocity between the Tx beam and the Rx beam is not established even in any one of the eNB and the UE, a UL beam pair determination process is required apart form DL beam pair determination.

Further, even when the eNB and the UE maintain beam correspondence, the eNB may use a UL BM procedure in order to determine a DL Tx beam without requesting report of a preferred beam by the UE.

The UL BM may be performed through beamformed UL SRS transmission and whether to apply UL BM of the SRS resource set is configured by a (higher layer parameter) usage. When the usage is configured as 'BeamManagement (BM)', only one SRS resource may be transmitted to each of a plurality of SRS resource sets at a given time instant.

The UE may be configured with one or more Sounding Reference Symbol (SRS) resource sets configured by (higher layer parameter) SRS-ResourceSet (through higher layer signaling, RRC signaling, etc.). For each SRS resource set, the UE may be configured with K (≥1) SRS resources (higher later parameter SRS-resources). Here, K is a natural number and a maximum value of K is indicated by SRS_capability.

Similarly to the DL BM, a UL BM procedure may also be divided into Tx beam sweeping of the UE and Rx beam sweeping of the eNB.

Hereafter, downlink transmission/reception operation will be described.

FIG. 13 illustrates an example of downlink transmission/reception operation.

A base station may schedule downlink transmission such as frequency/time resources, a transport layer, a downlink precoder, MCS, and the like (S1310). As an example, the base station may determine a beam for transmitting a PDSCH to a UE.

The UE may receive downlink control information (DCI: Downlink Control Information) for downlink scheduling (i.e., including scheduling information of the PDSCH) on a PDCCH from the base station (S1320).

DCI format 1_0 or DCI format 1_1 may be used for downlink scheduling, and DCI format 1_1 may include the following information. For example, DCI format 1_1 may include at least one of a DCI format identifier, a bandwidth part indicator, frequency domain resource assignment, time domain resource assignment, a PRB bundling size indicator, a rate matching indicator, ZP CSI-RS trigger, antenna port(s), transmission configuration indication (TCI), an SRS request, and demodulation reference signal (DMRS) sequence initialization.

In particular, the number of DMRS ports can be scheduled, and SU (single-user)/MU (multi-user) transmission scheduling can be performed according to each state indicated in the antenna port(s) field.

In addition, the TCI field consists of 3 bits, and the QCL for the DMRS may be dynamically indicated by indicating a maximum of 8 TCI states according to the TCI field value.

The UE may receive downlink data from the base station on the PDSCH (S1330).

When the UE detects a PDCCH including DCI format 1_0 or 1_1, the UE may decode the PDSCH according to an indication by the corresponding DCI. Here, when the UE receives a PDSCH scheduled by DCI format 1, the UE may set a DMRS configuration type by a higher layer parameter 'dmrs-Type', and the DMRS type is used to receive the PDSCH. In addition, the UE may set the maximum number of DMRS symbols front-loaded for the PDSCH by a higher layer parameter 'maxLength'.

In the case of DMRS configuration type 1, when a single codeword is scheduled for the UE and an antenna port mapped with an index of {2, 9, 10, 11 or 30} is specified, or two codewords are scheduled for the UE, the UE assumes that all remaining orthogonal antenna ports are not associated with PDSCH transmission to another UE. In the case of DMRS configuration type 2, if a single codeword is scheduled for the UE and an antenna port mapped with an index of {2, 10 or 23} is specified, or if two codewords are scheduled for the UE, the UE assumes that all the remaining orthogonal antenna ports are not associated with PDSCH transmission to another UE.

When the UE receives the PDSCH, it may assume precoding granularity P' to be consecutive resource blocks in the frequency domain. Here, P' may correspond to one of {2, 4, broadband}. If P' is determined to be wideband, the UE does not expect to be scheduled with non-contiguous PRBs and the UE may assume that the same precoding is applied to allocated resources. On the other hand, if P' is determined as any one of {2, 4}, a precoding resource block group (PRG) is divided into P' consecutive PRBs. The actual number of consecutive PRBs in each PRG may be one or more. The UE may assume that the same precoding is applied to consecutive downlink PRBs in the PRG.

In order for the UE to determine a modulation order, a target code rate, and a transport block size in the PDSCH, the UE may first read a 5-bit MCD field in the DCI and determine the modulation order and the target code rate. Then, the UE may read a redundancy version field in the DCI and determine a redundancy version. In addition, the UE may determine the transport block size using the number of layers and the total number of allocated PRBs before rate matching.

The above description may be applied in combination with methods proposed in the present disclosure to be described later, or may be supplemented to clarify the technical features of the methods proposed in the present disclosure. The methods described below are only divided for convenience of description, and some components of one method may be substituted with some components of another method or may be applied in combination.

In a next-generation wireless communication system (e.g., NR system), operations for an uplink transmission beam of the UE may be supported. As an example, an operation of determining the uplink transmission beam of the UE in Frequency Range 1 (FR1) and/or Frequency Range 2 (FR2) areas in Table 2 described above may be considered.

For example, in order to determine a specific uplink transmission beam, a higher layer parameter (e.g., RRC parameter) is configured to configure association information (or linkage information) with a value of the corresponding parameter. The association information may be configured based on an identifier (e.g., CSI-RS resource ID), an identifier (e.g., SSB ID, SSB index) of the SSB, and/or an identifier (e.g., SRS resource ID) of the SRS resource. The UE may determine, as the uplink transmission beam, a beam based on, i.e., determined (or identified) by the association information. As an example, it may be defined or limited that the association information based on the identifier of the CSI-RS resource and/or the identifier of the SSB is configured when a beam correspondence is established and association information based on the identifier of the SRS resource is configured when the beam correspondence of the UE is not completely supported.

In the next-generation wireless communication system, a method in which the BS configures (or indicates) the uplink transmission beam of the corresponding UE by using a specific unit based on implementation of the UE, etc., needs to be considered. For example, a method needs to be considered in which the BS configures and/or indicates the uplink transmission beam of the corresponding UE in a specific antenna group unit of the UE. Further, a method may need to be considered in which the BS configures and/or controls whether to receive a DL RS (e.g., CSI-RS resource ID, SSB ID/index) corresponding to the higher layer parameter (e.g., RRC parameter spatialRelationInfo) value and/or transmission of a UR RS (e.g., SRS resource ID) corresponding to the higher layer parameter value, based on a specific antenna group unit of the UE.

By considering this case, in the next-generation wireless communication system, a definition of a panel which becomes an actual transmission unit or reception unit of the UE and a configuration method related to the panel need to be supported.

The 'panel' referred to in the present disclosure may be modified to, and interpreted/applied as 'at least one panel', 'a plurality of panels', or 'panel group' (having similarity and/or a common value (having a specific characteristic viewpoint (e.g., Timing Advance (TA), Power control parameter, etc.)). Further, the 'panel' referred to in the present disclosure may be modified to, and interpreted/applied as 'at least one antenna port', 'a plurality of antenna ports', 'at least one uplink resource', 'a plurality of uplink resources, 'antenna port group', 'uplink resource group', or uplink resource set' (having a specific characteristic viewpoint (e.g., TA, Power control parameter, etc.)). In addition, the 'panel' referred to in the present disclosure may be modified, and interpreted/applied to 'at least one beam', 'a plurality of beams', 'at least one beam group', or 'at least one beam set' (having similarity and/or a common value in a specific characteristic viewpoint (e.g., TA, Power control parameter, etc.).

Further, the 'panel' referred to in the present disclosure may be defined as a unit for configuring the transmission beam and/or reception beam by the UE. For example, a transmission panel' may be defined as a unit in which a plurality of candidate transmission beams may be generated, but only one beam among the candidate transmission beams may be used in transmission at a specific timing. As an example, only one transmission beam (e.g., spatial relation information RS) may be used per transmission panel for transmission of a specific uplink signal and/or channel.

Further, in the present disclosure, the 'panel' may refer to 'at least one antenna port', 'a plurality of antenna ports', 'antenna port group', 'uplink resource group', or 'uplink resource set' of which uplink synchronization is common (or similar). In this case, the 'panel' may be modified to, and interpreted/applied as a generalized expression 'Uplink Synchronization Unit (USU)'. Further, in the present disclosure, the 'panel' may be modified to, and interpreted/applied as a generalized expression 'Uplink Transmission Entity (UTE)'.

The 'uplink resource (or resource group)' may be modified, and interpreted/applied as a PUSCH/PUCCH/SRS/PRACH resource (or a resource group, a resource set). Further, the modification, and interpretation/application may be applied even inversely, of course.

Further, in the present disclosure, the 'antenna (or antenna port)' may represent a physical or logical antenna (or antenna port). In other words, the 'panel' referred to in the present disclosure may be variously interpreted as 'group of a UE antenna element', group of a UE antenna port', 'group of a UE logical antenna', etc. For example, which physical/logical antennas (or antenna ports) are to be bound and mapped to one panel may be configured in various schemes by considering a location/distance/correlation between antennas, an RF configuration, and/or an antenna (port) virtualization scheme. Such a mapping process may vary depending on UE implementation. Further, the 'panel' referred to in the present disclosure may be modified, and interpreted/applied to 'a plurality of panels' or 'panel group' (having similarity and/or a common value in a specific characteristic viewpoint).

When the panel as described above is considered, panel unit activation or deactivation may be considered based on a common understanding of whether the panel between the BS and the UE is used. Therefore, there is an effect that power control may be efficiently performed. Further, since the BS may perform scheduling in units of the panel, an effect that the BS may control interference (e.g., uplink interference, etc.) in a desired direction (or beam region) may also be obtained in terms of a cell operation.

The UE may report the information related to the panel to the BS in the form of a UE capability. Further, the UE may also transmit the information related to the panel to the BS through semi-static or dynamic reporting. The BS may receive the information related to the panel from the UE to perform a specific control signaling of the panel unit, and may configure and/or indicate the related operation of the UE.

For example, when four SRS resource sets (e.g., RRC parameter usage is configured to 'BeamManagement') configured for a beam management (BM) usage are configured to the UE, each SRS resource set may be configured and/or defined to correspond to each panel of the UE. As an example, when four SRS resource sets are represented by SRS resource sets A, B, C, and D, and the UE implements a total of four (transmission) panels, each SRS resource set corresponds to one (transmission) panel to perform the SRS transmission.

As an example, implementation of the UE shown in Table 7 may be possible.

TABLE 7

| Maximum number of SRS resource sets across all time domain behavior (periodic/semi-persistent/aperiodic) | Additional constraint on the maximum of SRS resource sets per supported time domain behavior (periodic/semi-persistent/aperiodic) |
|---|---|
| 1 | 1 |
| 2 | 1 |
| 3 | 1 |
| 4 | 2 |
| 5 | 2 |
| 6 | 2 |
| 7 | 4 |
| 8 | 4 |

Referring to contents of Table 7, when the UE reports (or transmits), to the BS, UE capability information in which the number of SRS resource sets which may be supported by the UE itself is 7 or 8, the corresponding UE may be configured with up to a total of four SRS resource sets (for the BM usage) from the BS. In this case, as an example, the UE may also be defined, configured, and/or indicated to perform uplink transmission by making each of the SRS resource sets (for the BM usage) correspond to each panel (transmission panel and/or reception panel) of the UE. That is, an SRS resource set(s) for a specific usage (e.g., BM usage) configured to the UE may be defined, configured, and/or indicated to correspond to the panel of the UE. As an example, when the BS (implicitly or explicitly) configures and/or indicates, to the UE, a first SRS resource set in relation to the uplink transmission (configured for the BM usage), the corresponding UE may recognize to perform the uplink transmission by using a panel related (or corresponding) to the first SRS resource set.

Further, like the UE, when the UE that supports four panels transmits each panel to correspond to one SRS resource set for the BM usage, information on the number of SRS resources configurable per SRS resource set may also be include in the capability information of the UE. Here, the number of SRS resources may correspond to the number of transmittable beams (e.g., uplink beams) per panel of the UE. For example, the UE in which four panels are implemented may be configured to perform the uplink transmission in such a manner that two uplink beams correspond to two configured RS resources, respectively for each panel.

In the present disclosure, when a UE performs uplink transmission, in particular, when the UE transmits an uplink data channel (e.g., PUSCH), a method of performing configuration and/or indication in a panel unit is proposed. That is, when a base station schedules PUSCH transmission of the UE, the present disclosure proposes a method for configuring and/or indicating a panel and/or a beam for the corresponding PUSCH transmission.

A PUSCH transmission/reception procedure in a next-generation wireless communication system may be performed according to S1 to S4 below.

The UE may transmit (or report) UE capability information to the BS (S1). Here, the corresponding UE capability information may include information on a UE capability related to the PUSCH transmission, information related to a panel configuration of the UE, information related to a beam configuration of the UE, and the like. For example, the corresponding UE capability information may include information on the number of activatable panels of the UE, information on the maximum number of panels available for one transmission, information on the number of beams constituting the panel of the UE, and the like.

The UE may receive, from the BS, configuration information related to the PUSCH transmission (S2). In this case, the configuration information may be transferred through higher layer signaling (e.g., RRC signaling, etc.). Here, the configuration information may include configuration information (e.g., PUSCH configuration, etc.) for the PUSCH transmission, configuration information related to the panel and/or beam for the PUSCH transmission, and the like.

The UE may receive, from the BS, PUSCH scheduling information (S3). In this case, the scheduling information may be transferred through downlink control information (DCI) and/or MAC-CE. For example, the DCI may include Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, Uplink Shared Channel (UL-SCH) indicator, and the like. Further, configured SRS resources in an SRS resource set related to a higher layer parameter 'usage' may be indicated by an SRI field included in the DCI. Further, 'spatialRelationInfo' may be configured for each SRS resource and a value of 'spatialRelationInfo' may be one of {CRI, SSB, and SRI}.

The UE may transmit, to the BS, the PUSCH based on the PUSCH transmission related configuration information and the PUSCH scheduling information (S4). In this case, the corresponding PUSCH may be transmitted by considering the panel unit and/or the beam unit.

In relation to a PUSCH transmission scheme in the next-generation wireless communication system, codebook based transmission (CB transmission) and non-codebook based transmission (NCB transmission) may be supported. The UE may perform the CB transmission when a higher layer parameter txConfig in PUSCH-Config is configured to 'codebook' and performs the NCB transmission when the txConfig is configured to 'nonCodebook'. When the txConfig is not configured, the PUSCH transmission may be based on one PUSCH antenna port and this may be triggered by DCI format 0_0.

First, the codebook based uplink transmission will be described in detail.

In the case of the codebook based transmission, the UE may determine a PUSCH transmission precoder based on an SRS resource indicator (SRI), a transmit precoding matrix indicator (TPMI), and a transmit rank indicator (TRI). Here, the SRI, the TPMI, and the TRI may be given by SRS resource indicator field information and Precoding information and number of layers information included in the DCI field. The TPMI may be used for representing a precoder to be applied through antenna port {0 ... v−1} corresponding to an SRS resource selected by the SRI when multiple SRS resources are configured or one SRS resource is configured or the TPMI may be used for representing a precoder to be applied through antenna port {0 ... v−1} corresponding to the SRS resource.

A transmit precoder may be selected in an uplink codebook having the same multiple antenna ports as a higher layer parameter nrofSRS-Ports of SRS-Config. When the UE is configured to have the higher layer parameter txConfig configured to 'codebook', the UE may be constituted by at least one SRS resource. SRI indicated in slot n may be related to most recent transmission of an SRS resource before the PDCCH carrying SRI before slot n, i.e., an SRS resource identified by the SRI.

Further, in the case of the codebook based transmission, the UE may be constituted by a single SRS resource set and only one SRS resource may be indicated based on the SRI within the SRS resource set. The maximum number of SRS resources configured for the codebook based transmission may be 2. When aperiodic (AP)-SRS is configured to the UE, an SRS request field of the DCI may trigger transmission of the AP-SRS resource. Further, when multiple SRS resources are configured, the UE may expect that the higher layer parameter nrofSRS-Ports of SRS-Config will be configured as the same value in all SRS resources and the higher layer parameter resourceType of SRS-ResourceSet will be configured as the same value with respect to all SRS resources.

Next, the non-codebook based uplink transmission will be described in detail.

In the case of the non-codebook based transmission, the UE may determine the PUSCH precoder and the transmit rank thereof based on wideband SRI by the SRI field from the DCI. The UE may use one or multiple SRS resources for the SRS transmission and the number of SRS resources which may be configured to the UE for simultaneous transmission in the same RB may be the UE capability. Further, only SRS port may be configured with respect to each SRS resource. Further, when the higher layer parameter usage of SRS-Config is configured to 'nonCodebook', only one SRS resource set may be configured. The maximum number of SRS resources which may be configured for the non-codebook based uplink transmission is 4. Further, the SRI indicated in slot n may be related to the most recent transmission of the SRS resource before the PDCCH carrying the SRI before slot n, i.e., the SRS resource identified by the SRI.

In the case of the non-codebook based transmission, the UE may calculate a precoder to be used for transmission of precoded SRS based on measurement of a related NZP CSI-RS resource. The UE may be configured with only one NZP CSI-RS resource with respect to the SRS resource set. Further, in the case of the non-codebook based transmission, the UE does not expect that all spatialRelationInfo for associated CSI-RS and SRS resources in SRS-Config for the SRS resource set will be configured. Further, in the case of the non-codebook based transmission, when at least one SRS resource is configured, the UE may be scheduled by DCI format 0_1.

Embodiments described in the present disclosure are only divided for convenience of description, and some configurations and/or methods of one embodiment may be substituted with configurations and/or methods of other embodiments or may be applied in combination.

First Embodiment

Hereinafter, a panel and/or beam unit configuration and/or indication method which may be applied to the codebook-based (CB based) UL transmission and/or non codebook-based (NCB-based) UL transmission will be described. As an example, as described above, in the case of the codebook-based UL transmission and/or non-codebook-based UL transmission, a single SRS resource set or multiple SRS resource sets may be configured for the corresponding usage.

The SRS resource set configured for the usage of the codebook based UL transmission and/or non-codebook based UL transmission and the SRS resource set for the BM usage may be independently configured without a predetermined connection relationship. Here, since the SRS resource set for the BM usage may correspond to the panel of the UE as mentioned above, the connection relationship may mean a connection relationship between the SRS resource set configured for the usage of the codebook based UL transmission and/or non-codebook based UL transmission and the panel of the UE. When the SRS resource set configured for the usage of the codebook based UL transmission and/or non-codebook based UL transmission and the SRS resource set for the BM usage are independently configured as such, the BS may not know from which UE panel the PUSCH is transmitted in spite of following a form of performing (or implementing) the PUSCH transmission from a specific single panel. As an example, when two SRS resources are configured within the single SRS resource set configured for the usage of the codebook based UL transmission, to which panel(s) of four panels the UE performs is to perform transmission of a first SRS resource and a second SRS resource by mapping may be an implementation matter of the UE.

By considering such a point, the present disclosure proposes a method for configuring (and/or indicating) an association relationship (and/or a linkage) between the SRS resource set(s) for the usage of the codebook based and/or non-codebook based PUSCH transmission and the SRS resource(s) within each SRS resource set in relation to the SRS resource set(s) according to the configuration of the SRS resource set(s) for the specific BM usage and the SRS resource(s) within each SRS resource set. As an example, the association relationship may be configured through separate higher layer signaling or may be based on a predefined (or predetermined or preconfigured) rule or mechanism. Through this, the BS may configure (or indicate or schedule) (transmission) panel-specific UL transmission of the UE.

In the following description, the number of SRS resource sets configured for the usage of the codebook based UL transmission and/or non-codebook based UL transmission may be 2 or more, and for convenience of description, a case where two SRS resource sets are configured for the usage of the codebook based UL transmission and/or non-codebook based UL transmission is assumed. Two SRS resource sets are referred to as SRS resource set 1 and SRS resource set 2, respectively.

(Panel Unit and/or Beam Unit Based PUSCH Transmission/Reception Method)

Signaling related to the linkage relationship between the SRS resource set(s) configured for the usage of the codebook based UL transmission and/or non-codebook based UL transmission, and the SRS resource set(s) configured for the BM usage may be configured, defined, or indicated. Here, the SRS resource set(s) configured for the BM usage may correspond to the panel(s) of the UE as described above. In other words, the BS may configure or indicate, to the UE, information indicating the linkage relationship between the panel of the UE and the SRS resource(s) related to the PUSCH transmission through signaling.

For example, a method for transferring the information related to the linkage through the higher layer signaling (e.g., RRC signaling) and/or Medium Access Control-Control Element (MAC-CE) based signaling may be considered. The corresponding scheme may be related to step S2 and/or step S3 described above. In a state in which a set of candidate linkage configurations connected to the linkage is preconfigured through the higher layer signaling, a semi-dynamic control scheme such as which candidate linkage configuration is activated or deactivated through the MAC-CE based signaling, etc., may be considered. Further, a method for directly providing or updating a configuration related to the linkage by the MAC-CE based signaling itself may also be considered.

Specifically, the first SRS resource set for the codebook based UL transmission and/or non-codebook based UL transmission may be associated with SRS resource set A (e.g., penal A among the panels of the UE) for the BM usage and the second SRS resource set may be associated with SRS resource set C (e.g., panel C among the panels of the UE) for the BM usage. In other words, the panel of the UE related to the codebook based UL transmission and/or non-codebook based UL transmission may be configured and/or indicated through the higher layer signaling and/or MAC-CE based signaling. In this case, the linkage relationship itself may be updated, activated, deactivated, or indicated by the MAC-CE based signaling and/or dynamic signaling (e.g., DCI).

For example, when the PUSCH of the codebook based UL transmission and/or non-codebook based UL transmission is scheduled, indication information related to the first SRS resource set and/or the second SRS resource set may be transferred through a specific field (i.e., a specific field(s) within UL related DCI) of DCI (e.g., DCI format 0_1) for the corresponding scheduling. The corresponding scheme may be related to step S2 and/or step S3 described above. As an example, the indication information may be indicated by a Transmission Configuration Indicator (TCI) field within the DCI. Alternatively, in the case of configured grant based PUSCH transmission, the indication information may be configured through the higher layer parameter. Further, in relation to the SRS resource set indicated by the indication information, the BS indicates the SRS(s) indicator to the UE together, and as a result, the corresponding UE may determine (or select) a final SRI(s).

Further, even when only a single SRI field exists within the DCI, each state and/or codepoint within the specific field may be used for configuring and/or indicating the linkage relationship. As an example, the state and/or the codepoint may be preconfigured based on the higher layer signaling (and/or MAC-CE based signaling), and updated, activated, or deactivated (within a preconfigured parameter/value set) through the MAC-CE based signaling.

Through such a scheme, the BS may perform, to the UE, a panel unit indication (e.g., an SRS resource set unit indication) of the UE and/or a beam unit indication (e.g., SRI(s) within the indicated SRS resource set) within the panel in relation to the PUSCH transmission. In other words, the UE may perform the panel unit and/or beam unit PUSCH transmission based on the indication described above.

The above-described proposal scheme may be configured (or defined or indicated) to be applicable when a time-domain behavior of the SRS is aperiodic, semi-persistent, and/or periodic. In other words, the above-described proposal scheme may be configured and/or defined to be supported with respect to at least one of three types of time-domain behaviors.

When a PUSCH transmission/reception method based on the SRS resource set unit configuration and/or indication is generalized, the generalized method may be described as in the following example.

For example, assumed is a case where a linkage relationship between the SRS resource set for the PUSCH transmission and the SRS resource set (e.g., a unit corresponding to the panel of the UE) for the BM usage through i) a specific SRI field(s) or ii) a panel and/or beam indication related specific field (e.g., may be referred to as a UL TCI field, etc.) within specific UL DCI is configured (or indicated) through the RRC signaling and/or MAC-CE and/or DCI. In this case, a scheme may be considered, which enables an individual or local indicator(s) (e.g., SRI, UL RCI state, etc.) within the field to perform dynamic selection only with respect to an individual or local indicator within the corresponding linked SRS resource set(s) for the BM usage. As an example, a value indicated by the corresponding field may be configured or defined to be related to a pre-linked SRS resource set(s) for the BM usage. Of course, in the scheme may be applied to the configured grant based PUSCH transmission based on not the UL DCI but the higher layer parameter related to the configured grant.

In respect to the scheme, an operation may be considered in which one specific panel corresponds to each SRS resource set for the BM usage in an implementation situation of the UE (e.g., a UE that supports four panels), and each of multiple UL beams within the corresponding panel is applied to the individual or local SRS resource within the corresponding SRS resource set, and transmitted or swept. In this case, a method may be considered in which when the PUSCH is scheduled, qualities of SRSs transmitted from two specific panels among panels (e.g., four panels) supported by the UE are relatively more excellent and the SRSs are linked to a panel(s) which become(s) a candidate of the PUSCH scheduling. To this end, a configuration (and/or indication) operation may be applied, which links only two specific SS resource sets for the BM usage to a specific field within the corresponding UL DCI.

When two SRS resource sets down-selected or linked as such are SRS resource set A and SRS resource set C as in the example described above, dynamic selection may be configured to be made only for the individual or local beams within SRS resource set A and SRS resource set C through the corresponding field (i.e., panel/beam related scheduling field) of the corresponding UL DCI. Through this, an effect may be obtained, which enables dynamic beam selection within an indicated (or selected) panel while reducing overhead on a DCI bit size (bit-width). Further, information of the linked (or associated) SRS resource set A and SRS resource set C may be designed to be updated, activated, or deactivated through the higher layer signaling and/or the MAC-CE based signaling, and a panel selection related operation based on the corresponding scheme may be excluded from DCI overhead, and as a result, an effect that control channel overhead may be reduced may be obtained.

When the PUSCH transmission/reception method based on the SRS resource set unit configuration and/or indication is further generalized, the further generalized method may be described as in the following example.

For example, assumed is a case where a linkage relationship between the SRS resource set for the PUSCH transmission and the SRS resource set (e.g., a unit corresponding to the panel of the UE) for the BM usage through i) a specific SRI field(s) or ii) a panel and/or beam indication related specific field (e.g., may be referred to as a UL TCI field, etc.) within specific UL DCI is configured (or indicated) through the RRC signaling and/or MAC-CE and/or DCI. In this case, a scheme may be considered, which enables the individual or local indicator(s) (e.g., SRI, UL RCI state, etc.) within the field to perform dynamic selection only for a corresponding linked (higher) reference signal (RS) for the BM usage (i.e., related to the BM) and/or an individual or local reference signal identifier (RS ID) and/or channel identifier (channel ID) within a set(s) of the channels. Here, the set of the (higher) reference signal (RS) for the BM usage and/or the set(s) of the channels may be defined or configured to correspond to the panel of the UE similarly to the SRS resource set(s) for the BM usage.

As an example, the UE may apply the indicated panel and/or beam to the PUSCH transmission. When a DL signal and/or channel is linked (or indicated) as a reference of the PUSCH transmission, a UL transmission beam corresponding (or reciprocal) to the corresponding DL reception beam may be configured and/or defined to be applied to the PUSCH transmission.

The set(s) of the reference signals and/or the set(s) of the channels for the (BM usage) may be related to the panel unit and/or beam unit indication of the UE, and particularly, defined, configured, or indicated to include at least one among the following examples. In the following examples, the group may be replaced with the set, and one or more examples may be combined and applied.

As an example, the set(s) of the reference signals and/or the set(s) of the channels may include a specific group of the CSI-RS resource(s) and/or a CSI-RS resource set(s). In other words, the set(s) of the corresponding reference signals may include a unit (e.g., CSI-RS resource setting) of grouping a specific CSI-RS resource(s). And/or the specific group may be limitedly constituted only by a CSI-RS resource(s) for a tracking reference signal (TRS) usage in which a higher space QCL reference is configured. And/or, when a CSI-RS resource(s) for a DL CSI acquisition usage is constituted by the specific group, the case may be limited only to a case where the CSI-RS resource(s) includes a spatial QCL reference RS(s).

As another example, the set(s) of the reference signals and/or the set(s) of the channels may include a specific group constituted by a synchronization signal block (SSB) (identifier (ID)(s). In this case, it may be limited or allowed that all SSBs which may be included in the specific group are SSBs configured for the BM usage. Here, the SSB configured for the BM usage may mean an SSB configured in at least one resource setting for DL reporting related to the BM.

As yet another example, the set(s) of the reference signals and/or the set(s) of the channels may include a specific group constituted by a control resource set (CORESET) (identifier (ID)(s). As an example, it may be limited or allowed that the control resource set is only linked to at least one specific search space configuration. And/or, an identifier(s) of the search space configuration may also become the set(s) of the reference signals and/or the set(s) of the channels. Information of an individual control resource set and the corresponding associated panel and/or beam may be configured, applied, and/or indicated in association with the identifier(s) of the search space configuration.

As yet another example, the set(s) of the reference signals and/or the set(s) of the channels may include a specific group constituted by a PUCCH resource (identifier (ID)(s). As an example, as being configured (or associated, indicated) by an individual specific PUCCH resource ID(s), the UE may be configured to perform the codebook based and/or non-codebook based PUSCH transmission based on a configuration including beam information applied to the corresponding PUCCH resource ID(s). And/or, as being configured (or associated, indicated) by a specific set unit in which a preconfigured (or defined) specific PUCCH resource ID(s) is grouped, the UE may be configured to perform the codebook based and/or non-codebook based PUSCH transmission based on a configuration including the beam information applied to the corresponding PUCCH resource ID(s). And/or, by a default configuration, an operation may be configured or defined, in which a predetermined PUCCH resource (e.g., a PUCCH resource corresponding to a lowest or highest index) is linked to the codebook based and/or non-codebook based PUSCH transmission by default. Here, the default configuration may be applied to a case where there is no reference signal set(s) and/or channel set(s) associated with the codebook based and/or non-codebook based PUSCH transmission, a case where a specific (ambiguous) interval is configured, etc.

When a (DL and/or UL related) reference signal set(s) and/or channel set(s) are/is linked (or configured, indicated) to the codebook based and/or non-codebook based PUSCH transmission based on the above-described schemes, the UE may be configured to perform the PUSCH transmission, based on a panel applied to previous reception and/or a panel applied to previous transmission, through a panel corresponding thereto. Hereinafter, the corresponding scheme is described based on the DL related reference signal set(s) and/or channel set(s), but this is just for convenience of description, and the scheme described below may also be extensively applied to the UL related reference signal set(s) and/or channel set(s), of course.

For example, as in the examples, when the DL related reference signal set(s) and/or channel set(s) is linked (or configured, indicated) to the PUSCH transmission, the UE may be defined (or configured, indicated) to perform panel unit and/or beam unit selective UL transmission during subsequent PUSCH scheduling, based on a (reception) panel of a specific UE applied during receiving, through a (transmission) panel of the UE corresponding (i.e., reciprocal) thereto.

Based on the (reception) panel, the (transmission) panel of the UE corresponding thereto may mean a panel for a UL transmission usage associated (or implemented), when the UE implements a specific DL receiving panel, so as to perform transmission in which beam correspondence (and/or panel correspondence) is maintained (to a specific predetermined or preconfigured level) with respect to the implementation of the panel. As an example, the UE may be implemented in the form of a specific transmission/reception panel in which both DL reception and UL transmission are performed with the same specific panel.

Further, when the DL related reference signal set(s) and/or channel set(s) are/is linked (or configured, indicated) to the PUSCH transmission, the UE may be defined (or configured, indicated) to apply the corresponding indicated DL related reference signal to a pathloss compensation operation during power control. As an example, the pathloss compensation operation may be included in an open-loop power control process related to the PUSCH transmission.

And/or, the DL related reference signal associated with the corresponding indicated DL channel (e.g., specific CORESET(s)) may be defined (or configured, indicated) to be applied to the pathloss compensation operation during the power control. Here, the DL related reference signal may be a reference signal used for receiving the corresponding DL channel, and may include, for example, a DMRS for CORESET(s) (or QCLed). Further, the pathloss compensation operation may be included in the open-loop power control process related to the PUSCH transmission.

And/or, a method may be considered, in which a structure of indicating the SRI by the DCI is maintained, and the DL related reference signal set(s) and/or channel set(s) configures (and/or indicates) an (additional linkage (or association) relationship to an SRS resource set level for the usage of the codebook based and/or non-codebook based uplink transmission. As an example, the linkage (or association) relationship may be configured and/or indicated through the higher layer signaling (e.g., RRC signaling) and/or MAC-CE based signaling. In this case, an operation may be defined (or configured, indicated) in which the UE performs the uplink transmission by using a (corresponding) beam and/or panel applied to reception of the corresponding reference signal set(s) and/or channel set(s).

For example, based on the above-described scheme of configuration and/or indication, the corresponding UE may transmit the PUSCH and/or SRS based on (the SRS resource(s) within) the associated SRS resource set(s) by using the (corresponding) beam and/or panel applied to reception of the DL reference signal set(s) and/or channel set(s). As an example, when the first SRS resource set and the second SRS resource set are configured for the codebook based PUSCH transmission and/or non-codebook based PUSCH transmission, it may be configured and/or indicated that the first SRS resource set is associated (or linked) to SSB #3 (i.e., an SSB corresponding to index/ID #3) and the second RS resource set is associated with SSB #7 (i.e., an SSB corresponding to index/ID #7). As another example, when the first SRS resource set and the second SRS resource set are configured for the SRS transmission, it may be configured and/or indicated that the first SRS resource set is associated with SSB #3 and the second SRS resource set is associated with SSB #7.

When the linkage (or association relationship) as in the example is configured and/or indicated, the UE may transmit the PUSCH and/or SRS through the configured SRS resource(s) within the first SRS resource set by using a (transmission) panel corresponding to a (best, preferred) (reception) panel applied when receiving SSB #3. Here, the reception panel and/or transmission panel of the UE may be one same transmission/reception panel.

Further, in each of the SRS resource(s) within the indicated SRS resource set, spatial relation information (e.g., RRC parameter spatial relation info, etc.) may be configured to a unique resource level. As an example, when an independent CSI-RS resource indicator (CRI) is configured for each SRS resource, the UE may be configured to perform transmission by using an uplink beam corresponding (i.e., reciprocal) to corresponding CRI reception when transmitting the PUSCH and/or SRS through each corresponding SRS resource. Here, a separate (or additional) linkage of SSB #3 is assigned for each SRS resource set, so that the UE may be configured (and/or indicated) to determine a (best, preferred) beam for CSI-RS reception for the SRI within the (transmission) panel of the UE corresponding to the SRS resource set, and perform the transmission of the PUSCH and/or SRS with a transmission beam corresponding to the determined beam.

The above-described example may be applied by replacing the first SRS resource set with the second SRS resource set and replacing SSB #3 with SSB #7, and extended to an example related to multiple SRS resource sets in addition to two cases.

In other words, the linkage (or association) relationship of the above-described SRS resource set level may be interpreted as panel selection (and/or panel association) of the UE. Further, the linkage (or association) relationship of the SRS resource level within the SRS resource set may be interpreted as beam selection (and/or beam association) within the selected (and/or associated) panel.

And/or, the beam (and/or beam association) relationship may be configured at an SRS resource level in addition to the SRS resource set level. As an example, when the first SRS resource set and the second SRS resource set are configured for the codebook based PUSCH transmission, the non-codebook based PUSCH transmission, and/or the SRS transmission, it may be configured and/or indicated that the first SRS resource set is associated with SSB #3 and the second SRS resource set is associated with SSB #7. In this case, it may be configured and/or indicated that SRS resource #4 within the first SRS resource set is associated with CRI #11 and SRS resource #5 within the first SRS resource set is associated with CRI #12. Further, it may be configured and/or indicated that SRS resource #8 within the second SRS resource set is associated with CRI #11 and SRS resource #9 within the first SRS resource set is associated with CRI #14. The UE may transmit a codebook based PUSCH, a non-codebook based PUSCH, and/or an SRS by using the associated resource set(s) and the associated SRS resource(s).

As in the example, CRI #11 may be commonly configured in a specific SRS resource (e.g., SRS resource #4) within the first SRS resource set and redundantly configured in a specific SRS resource (e.g., SRS resource #8) within the second SRS resource set. Further, there may be a separate UE capability for whether the redundancy configuration is allowed and a procedure in which the UE reports the corresponding UE capability information to the BS may be applied. Through this, the above-described scheme may be applied according to the whether the redundancy configuration is allowed and/or whether the UE is implemented.

For example, when the redundancy configuration is allowed, the UE may receive a CSI-RS resource corresponding to CRI #11 with a transmission/reception module (e.g., transmission/reception panel) of the UE corresponding to the first SRS resource set, and the UE may transmit the codebook based PUSCH, the non-codebook based PUSCH, and/or the SRS within SRS resource #4 by using a transmission beam corresponding to a reception beam of the CSI-RS resource within the transmission/reception module. Further, the corresponding UE may receive a CSI-RS resource corresponding to CRI #11 with a transmission/reception module (e.g., transmission/reception panel) of the UE corresponding to the second SRS resource set, and the UE may transmit the codebook based PUSCH, the non-codebook based PUSCH, and/or the SRS in SRS resource #8 by using the transmission beam corresponding to the reception beam of the CSI-RS resource within the transmission/reception module. As an example, each of the transmission/reception module may be determined by reception of SSB #3 and reception of SSB #7. Further, the CSI-RS resource corresponding to CRI #11 may mean a specific beam among the beams of the BS. In other words, the corresponding CSI-RS resource may be based on the same transmission beam of the BS.

If both SRS resource #4 and SRS resource #8 are indicated when the UE schedules the UL transmission of the UE, the BS may obtain an effect of being capable of effectively receiving the corresponding UL transmission with a BS reception beam corresponding to the transmission beam of CRI #11 when receiving the corresponding UL transmission. In other words, a plurality of panel(s) and/or a plurality of beam(s) of the UE may correspond (or be reciprocal) to a single panel and/or a single beam of the BS.

Further, in order to support the above-described proposal operations, a source RS of spatial QCL (e.g., QCL type D) configured and/or indicated for the CSI-RS resource corresponding to CRI #11 exemplified above may be configured to become {SSB #3 and/or SSB #7} (e.g., integration of SSB #3 and SSB #7 in terms of a beam region). Further, a scheme may also be considered, in which when CRI #11 is an aperiodic CSI-RS type, the BS selectively changes and/or indicates the source RS of the spatial QCL followed by CRI #11 to be SSB #3 or SSB #7 at every transmission time by individual trigger based on the DCI. In this case, the change and/or indication may be dynamic or semi-dynamic.

Further, in the present disclosure, a method may also be considered, which applies the above-described proposal scheme by considering the time domain behavior(s) in relation to scheduling (i.e., UL scheduling) for the codebook based PUSCH transmission and/or non-codebook based PUSCH transmission.

For example, in the above contents, a method for dynamically indicating a local resource identifier (e.g., local SRS resource ID) by using the UL DCI (e.g., DCI format 0_1) is described. In addition, when multiple SRS resource sets are configured, in which the usage of the SRS resource is configured to the usage of the codebook based uplink transmission and/or the non-codebook based uplink transmission, a scheme of performing the panel unit and/or beam unit indication by considering the time-domain behaviors of the multiple SRS resource sets may be considered. A codepoint(s) (e.g., SRI state, UL TCI state) of a specific field (e.g., SRI field, UL TCI state field, etc.) within the UL DCI may be mapped over an SRS resource set(s) configured for the same specific time-domain behavior among the multiple SRS resource sets, and a scheme of configuring and/or indicating dynamic panel selection by using the codepoint(s) may be applied. The reason is that the SRS resources within the multiple SRS resource sets may be configured by mixing with a codepoint(s) within a specific field of the corresponding UL DCI.

As an example, in this regard, information related to which time domain behavior the BS is to apply the corresponding scheme to may be configured (or defined) to be down-selected, activated, deactivated, updated, changed, and/or switched based on the higher layer signaling (e.g., RRC signaling) and/or MAC-CE signaling. As an example, in this regard, mapping of the codepoint(s) may be performed by combinatorial mapping. In other words, the information may be mechanically configured and/or defined so that a specific field within the UL DCI is configured by a rule of making sequential mechanical codepoint mapping of the SRS resource(s) within the corresponding SRS resource set.

When the scheme in the example is applied, a power control behavior for the codebook based PUSCH transmission and/or non-codebook based PUSCH transmission may be configured to follow the power control scheme corresponding to the SRS resource set to which a specific codepoint (e.g., SRI, UL TCI state) in a specific field of the UL DCI. As an example, a power for the codebook based PUSCH transmission and/or non-codebook based PUSCH transmission may be controlled by applying a power control related parameter configured in the corresponding SRS resource set. Further, a power control may also be performed, which is interlocked based on a specific offset (e.g., power control related offset value).

Further, unlike the above-described scheme, in the case where two or more time-domain behaviors are configurable together, only SRS resources following the same time-domain behavior may be defined or configured to be indicated in the case where two or more SRS resources are indicated together when performing the PUSCH scheduling. Alternatively, the UE may expect to be indicated with only the SRS resources following the same time-domain behavior. Here, the case where two or more SRS resources are indicated together means multi-beam and/or multi-panel based simultaneous UL transmission.

Further, in at least one of the proposal methods described above in the present disclosure, a specific linkage (or association) related signaling may be defined or configured, which applies SRS resource set(s) configured for other usages (e.g., BM usage, antenna switching usage, etc.) together for the codebook based and/or non-codebook based PUSCH transmission without configuring the SRS resource set(s) (separately or exclusively) for the usage of the codebook based and/or non-codebook based PUSCH transmission. In this case, an effect may be obtained, which is capable of using the SRS resource set(s) for other usages for the usage of the codebook based and/or non-codebook based PUSCH transmission only by the signaling without a process of configuring the SRS resource set(s) for the usage of the codebook based and/or non-codebook based PUSCH transmission. Through this, there is an effect of being capable of reducing a latency required for final PUSCH scheduling and reducing even overhead related to the SRS resource configuration.

The corresponding scheme may be applied by considering the number of ports of the SRS resource related to the corresponding SRS resource set, implementation (e.g., nT/mR implementation, etc.) of the UE related to antenna switching, etc. In other words, when the corresponding scheme is suitable for the implementation situation (i.e., capability information of the UE, etc.) of the UE, the corresponding scheme may be selectively applied.

Further, in relation to the scheme proposed in the present disclosure described above, in the case of the non-codebook based PUSCH transmission, the UE may also report, to the BS, its capability information that simultaneous uplink transmission based multiple UE panels is impossible. As an example, even though two or more panels of the panels supported by the UE are activated for the PUSCH transmission, information that only one panel is available for each actual transmission may be included in the form of the capability information of the UE. In the following description, the capability information of the UE is described based on the non-codebook based PUSCH transmission, but may be extensively applied even to other uplink transmission (e.g., codebook based PUSCH, PUCCH, SRS, PRACH, etc.).

In the case where there are two or more SRS resources when scheduling the uplink transmission (e.g., PUSCH transmission), all of the corresponding SRS resources may also be limited to be constituted only by SR resources corresponding to SRS resource identifiers which belong to the same specific SRS resource set. That is, the UE may expect that all of the SRS resources will be constituted by the SRS resources which belong to the same (specific c) SRS resource set. Here, two or more SRS resources may be indicated by a specific field (e.g., SRI field) within the DCI.

For example, the UE may report, to the BS, the UE capability information that simultaneous transmission based on multiple panels is impossible as described above, and may be configured with the first SRS resource set and the second SRS resource set for the non-codebook based PUSCH transmission. Here, the UE capability information may include information (e.g., 2, 4) on the maximum number of layers which the UE may support for the non-codebook based PUSCH transmission. Further, the first SRS resource set may be constituted by SRS resource #1, SRS resource #2, SRS resource #3, and SRS resource #4, and the second SRS resource set may be constituted by SRS resource #5, SRS resource #6, SRS resource #7, and SRS resource #8. Further, the UE capability information may include the information on the maximum number of layers which the UE may support for the non-codebook based PUSCH transmission.

When the UE reports that the maximum number of layers is 2, the UE may effectively recognize (or expect) an operation in which up to 2 SRS resources are scheduled within the first SRS resource set or up to 2 SRS resources are scheduled within the second SRS resource set. However, the corresponding UE may not expect a scheduling indication of applying both one SRS resource within the first SRS resource set and one SRS resource within the second SRS resource set to the PUSCH transmission. The reason is that the scheduling indication is contrary to the capability information of the UE, which the corresponding UE reports to the BS.

Similarly to this, when the UE reports, to the B S, that simultaneous uplink transmission based on other panels (i.e., based on other SRS resource sets) is possible, the corresponding UE may additionally (or independently) report, to the BS, information on the maximum number of layers supportable for each panel in addition to the information on the maximum number of layers supportable for the non-codebook based PUSCH transmission.

For example, a case is considered, in which the UE reports that the maximum number of layers supportable for the non-codebook based PUSCH transmission is 4 and reports that the maximum number of layers supportable for each panel is 2. The corresponding UE may effectively recognize (or expect) an operation in which up to 2 SRS resources are scheduled within the first SRS resource set, up to 2 SRS resources are scheduled within the second SRS resource set, or up to 2 SRS resources in the first SRS resource set and up to 2 SRS resources in the second SRS resource set are simultaneously scheduled. However, the UE may not expect other scheduling indications. The reason is that the scheduling indication is contrary to the capability information of the UE, which the corresponding UE reports to the BS.

Further, similarly to this, when the UE reports, to the BS, that simultaneous uplink transmission based on other panels (i.e., based on other SRS resource sets) is possible, the corresponding UE may additionally (or independently) report, to the BS, the information on the maximum number of layers supportable for each panel as additional capability information limited to a case (or situation) in which simultaneous PUSCH transmission through two or more panels is scheduled, in addition to the information on the maximum number of layers supportable for the non-codebook based PUSCH transmission.

For example, a case is considered, in which the UE reports that the maximum number of layers supportable for the non-codebook based PUSCH transmission is 4 and reports that the maximum number of layers supportable for each panel is 2 only in the case (or situation) in which simultaneous PUSCH transmission through two or more panels is scheduled. The corresponding UE may effectively recognize (or expect) an operation in which up to 4 SRS resources are scheduled within the first SRS resource set, up to 2 SRS resources are scheduled within the second SRS resource set, or up to 4 SRS resources in the first SRS resource set and up to 2 SRS resources in the second SRS resource set are simultaneously scheduled. However, the UE may not expect a scheduling indication of applying both one SRS resource within the first SRS resource set and three SRS resources within the second SRS resource set to the PUSCH transmission. The reason is that the scheduling indication is contrary to the capability information of the UE, which the corresponding UE reports to the BS.

Further, in the methods and/or operations proposed in the present disclosure, indication information related to scheduling of the codebook PUSCH transmission and the non-codebook based PUSCH transmission may be configured and/or indicated by a specific field (or state) within DCI for the corresponding scheduling. On the contrary, when the corresponding PUSCH transmission is based on a configured grant, the indication information may be configured and/or indicated through the higher layer parameter (e.g., RRC signaling and/or MAC-CE signaling).

If methods and/or operations proposed in the present disclosures are applied, in relation to an operation of performing, by a UE, codebook-based PUSCH transmission, non-codebook-based PUSCH transmission and/or SRS transmission, there is an effect in that a base station can control uplink transmission in a specific panel unit and/or specific beam unit of the UE. Accordingly, panel and/or beam selective PUSCH scheduling accompanied by enhanced power control of a panel and/or beam unit can be performed.

Second Embodiment

A method of configuring and/or indicating uplink transmission of multiple transmission units (e.g., multiple panels)

based on the aforementioned specific transmission unit (e.g., a panel, UTE) 15 described. In the present embodiment, the specific transmission unit is denoted and described as a panel, for convenience of description, but may be substituted with another technical term and applied.

In the case of panel-specific uplink transmission, panel indication based on a panel ID may be performed. In this case, the panel-specific uplink transmission may mean uplink transmission of a panel unit, and may also be denoted as panel-selective uplink transmission. Furthermore, a panel identifier (ID) includes identification information of a panel of a UE and/or a base station, and may also be substituted with an expression of a UTE ID, etc. Furthermore, uplink transmission (e.g., the transmission of an uplink signal and/or the transmission of an uplink channel) through different panels may be performed based on scheduling (and/or indication) by a base station, etc.

In this case, the UE may report, to the base station, the number of panels (e.g., UTEs) supported by the UE in the form of UE capability information. For example, the UE may report, to the base station, information on a maximum number of panels supportable by the UE for one or more uplink transmissions. The UE may report, to the base station, information on the number of panels simultaneously supported by the UE for uplink transmission.

For example, if a panel is defined as a concept corresponding to an SRS resource set as described above, a configuration and/or indication method of a panel may be differently configured (or defined) depending on the usage of the corresponding SRS resource set. Hereinafter, in Methods 1 to 4, operations of a UE and/or a base station related to the configuration and/or indication of a panel depending on each usage are described.

Method 1)

First, a case where identification information (hereinafter a panel ID) indicating a panel is configured for each SRS resource set configured for BM usage is described. The configuration (and/or mapping) of a panel ID for the SRS resource set may be performed through higher layer signaling (e.g., RRC signaling).

In this case, a UE may not expect that the same panel ID is configured for different SRS resource sets configured for BM usage. That is, if a base station configures (and/or schedules) uplink transmission in the UE, the base station may map (or configure) different panel IDs for different SRS resource sets. In other words, the UE may receive a configuration and/or indication indicating that the UE has to apply different panel IDs to different SRS resource sets configured for BM usage.

The SRS resource sets may be based on the same time-domain behavior. For example, the time-domain behavior may include a periodic operation, an aperiodic operation, or a semi-persistent operation. That is, if an operation of a UE and/or a base station is limited to only a specific identical time-domain behavior, the same panel ID may be redundantly (or configured or mapped) for each SRS resource set with respect to different time-domain behaviors. Accordingly, there are technical effects in that an SRS transmitted by the same panel (e.g., the same UTE) can be configured as one or more of periodic, semi-persistent, or aperiodic and the flexibility of SRS transmission can be improved.

If a panel ID is not configured for an SRS resource set for BM usage(s), a panel to be applied to the corresponding SRS resource set may be determined based on an UE implementation. For example, if a panel ID has not been configured for some (e.g., a subset) of SRS resource sets configured for BM usage with respect to a UE, the UE may apply (or map) a panel to an SRS resource set for which a panel ID is not configured based on an UE implementation, and may perform SRS transmission through the corresponding panel. Alternatively, a specific rule on which the UE is configured to perform SRS transmission by mapping panels to an SRS resource set from a panel not allocated to an SRS resource set may be defined (or configured).

A UE may perform SRS transmission by using a corresponding panel ID with respect to an SRS resource set(s) for which a panel ID is (explicitly) configured. In contrast, a corresponding UE may be defined (and/or configured or indicated) to perform SRS transmission by first mapping a panel ID(s) other than a configured panel ID(s) to an SRS resource set(s) for which a panel ID is not configured. Accordingly, there is an effect in that an SRS beam sweeping and/or SRS panel sweeping operation of a panel unit can be performed. For example, a UE may sequentially (or intersectionally) perform mapping between an SRS resource set and a panel ID from a non-configured (and/or non-allocated) panel ID. If all panel IDs supported by a corresponding UE have been mapped at least once, an operation of redundantly mapping an already-mapped panel ID to an SRS resource set may be defined (and/or configured or indicated). There is a technical effect in that a UE can equally perform uplink transmission by using a different panel(s) because a panel ID is equally allocated (or mapped).

Method 2)

Next, a case where identification information (hereinafter panel ID) indicating a panel is configured for each SRS resource set configured for codebook usage is described. To configure an SRS resource set for codebook usage may mean that the corresponding SRS resource set is configured for codebook-based PUSCH transmission. In this case, multiple SRS resource sets for codebook usage may be configured. A configuration (and/or mapping) of a panel ID for an SRS resource set may be performed through higher layer signaling (e.g., RRC signaling).

If a panel ID is not configured for an SRS resource set(s) for codebook usage, a panel to be applied to the corresponding SRS resource set may be determined based on a UE implementation. A panel ID may be indicated by DCI (i.e., an UL grant) for scheduling for PUSCH transmission. That is, information on a corresponding panel ID may be included in the DCI. Furthermore, if a panel ID indicated by the DCI is also configured for an SRS resource set for BM usage, a UE needs to transmit a scheduled PUSCH by using the same panel indicated by the panel ID.

If a panel ID(s) is configured (and/or indicated, associated or mapped) for an SRS resource set for codebook usage, upon PUSCH scheduling, a transmit rank and/or a transmit PMI for a corresponding PUSCH may be indicated through a specific transmit rank indicator (TRI) and/or a transmit precoding matrix indicator (TPMI). Table 8 illustrates an example of TPMI indices which may be indicated through a TPMI.

TABLE 8

| TPMI index | W (ordered from left to right in increasing order of TPMI index) |
|---|---|
| 0-7 | $\frac{1}{2}\begin{bmatrix}1\\0\\0\\0\end{bmatrix} \frac{1}{2}\begin{bmatrix}0\\1\\0\\0\end{bmatrix} \frac{1}{2}\begin{bmatrix}0\\0\\1\\0\end{bmatrix} \frac{1}{2}\begin{bmatrix}0\\0\\0\\1\end{bmatrix} \frac{1}{2}\begin{bmatrix}1\\0\\1\\0\end{bmatrix} \frac{1}{2}\begin{bmatrix}1\\0\\-1\\0\end{bmatrix} \frac{1}{2}\begin{bmatrix}1\\0\\j\\0\end{bmatrix} \frac{1}{2}\begin{bmatrix}1\\0\\-j\\0\end{bmatrix}$ |
| 8-15 | $\frac{1}{2}\begin{bmatrix}0\\1\\0\\1\end{bmatrix} \frac{1}{2}\begin{bmatrix}0\\1\\0\\-1\end{bmatrix} \frac{1}{2}\begin{bmatrix}0\\1\\0\\j\end{bmatrix} \frac{1}{2}\begin{bmatrix}0\\1\\0\\-j\end{bmatrix} \frac{1}{2}\begin{bmatrix}1\\1\\1\\1\end{bmatrix} \frac{1}{2}\begin{bmatrix}1\\1\\j\\j\end{bmatrix} \frac{1}{2}\begin{bmatrix}1\\1\\-1\\-1\end{bmatrix} \frac{1}{2}\begin{bmatrix}1\\1\\-j\\-j\end{bmatrix}$ |
| 16-23 | $\frac{1}{2}\begin{bmatrix}1\\j\\1\\j\end{bmatrix} \frac{1}{2}\begin{bmatrix}1\\j\\j\\-1\end{bmatrix} \frac{1}{2}\begin{bmatrix}1\\j\\-1\\-j\end{bmatrix} \frac{1}{2}\begin{bmatrix}1\\j\\-j\\1\end{bmatrix} \frac{1}{2}\begin{bmatrix}1\\-1\\1\\-1\end{bmatrix} \frac{1}{2}\begin{bmatrix}1\\-1\\j\\-j\end{bmatrix} \frac{1}{2}\begin{bmatrix}1\\-1\\-1\\1\end{bmatrix} \frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix} \frac{1}{2}\begin{bmatrix}1\\-j\\j\\1\end{bmatrix} \frac{1}{2}\begin{bmatrix}1\\-j\\-1\\j\end{bmatrix} \frac{1}{2}\begin{bmatrix}1\\-j\\-j\\-1\end{bmatrix}$ — — — — |

If a panel ID(s) is configured for an SRS resource set for codebook usage, to indicate a specific TPMI index among TPMI indices which may be indicated through a corresponding TPMI with respect to a corresponding UE may be restricted. For example, there may be restriction by which a non-coherent (nonCoherent)-related TPMI index(s) and/or a partial and non-coherent (PartialAndNonCoherent)-related TPMI index(s) is not indicated. The non-coherent-related TPMI index(s) may include an index(s) when one non-zero value is present per column vector (e.g., TPMI indices 0 to 3 in Table 8). The partial and non-coherent-related TPMI index(s) may include an index(s) when at least one non-zero value is present per column vector (e.g., TPMI indices 0 to 15 in Table 8). In this case, the restriction may be automatically applied through a rule, etc. or may be applied through a configuration and/or indication of a base station, etc.

For example, a specific TPMI index(s) indicating a TPMI over multiple UE panels may be interpreted as a TPMI index(s) present a method of configuring (and/or mapping or associating) a panel ID. As described in the present method, if a base station independently (or separately) applies a specific panel of a UE to scheduling (and/or configuration indication) along with a specific panel ID(s), a specific TPMI index(s) indicating a TPMI over multiple UE panels may be excluded upon scheduling. Accordingly, there is a technical effect in that DCI overhead can be reduced because a redundant indication possibility of a panel, etc. is obviated and the size of a TPMI indication field can also be reduced.

The aforementioned TPMI restriction operation (i.e., codebook-subset restriction operation) may be applied in association with corresponding reporting if there is reporting of UE capability information related to the TPMI restriction operation. And/or the TPMI restriction operation may be selectively applied along with a separate configuration and/or indicator of a base station separately from the reporting of the UE capability information.

Furthermore, a panel ID may be associated (or configured or mapped) in an SRS resource level within an SRS resource set. For example, a panel ID may be configured for each SRS resource within an SRS resource set configured for codebook usage. A panel ID may be indicated by DCI (i.e., an UL grant) for PUSCH scheduling. Furthermore, if a panel ID indicated by the DCI is also configured for an SRS resource set for BM usage, a UE needs to transmit a scheduled PUSCH by using the same panel indicated by the panel ID. Furthermore, although a panel ID is configured for each SRS resource, the aforementioned TPMI restriction operation may be applied.

Method 3)

Next, a case where identification information (hereinafter panel ID) indicating a panel is configured for each SRS resource set configured for non-codebook usage is described. To configure an SRS resource set for non-codebook usage may mean that the corresponding SRS resource set is configured for PUSCH transmission based on a non-codebook. In this case, multiple SRS resource sets for non-codebook usage may be configured. A configuration (and/or mapping) of a panel ID for an SRS resource set may be performed through higher layer signaling (e.g., RRC signaling).

If a panel ID is not configured for an SRS resource set(s) for non-codebook usage, a panel to be applied to the corresponding SRS resource set may be determined based on a UE implementation. A panel ID may be indicated by DCI (i.e., an UL grant) for scheduling for PUSCH transmission. That is, information on the corresponding panel ID may be included in the DCI. Furthermore, if a panel ID indicated by the DCI is also configured for an SRS resource set for BM usage, a UE needs to transmit a scheduled PUSCH by using the same panel indicated by the panel ID. Accordingly, uplink simultaneous transmission based on a non-codebook from multiple panels may be configured, indicated and/or scheduled.

Furthermore, a panel ID may be associated (or configured or mapped) in an SRS resource level within an SRS resource set. For example, a panel ID may be configured for each SRS resource within an SRS resource set configured for non-codebook usage. The panel ID may be indicated by DCI (i.e., an UL grant) for PUSCH scheduling. Furthermore, if a panel ID indicated by the DCI is also configured for an SRS resource set for BM usage, a UE needs to transmit a scheduled PUSCH by using the same panel indicated by the panel ID. Furthermore, although a panel ID is configured for each SRS resource, the aforementioned TPMI restriction operation may be applied. Accordingly, uplink simultaneous transmission based on a non-codebook from multiple panels may be configured, indicated and/or scheduled.

Method 4)

Next, a case where identification information (hereinafter panel ID) indicating a panel is configured for each SRS resource set configured for antenna switching usage is described. In this case, multiple SRS resource sets for antenna switching usage may be configured. A configuration (and/or mapping) of a panel ID for the SRS resource set may be performed through higher layer signaling (e.g., RRC signaling).

If a panel ID is not configured for an SRS resource set(s) for antenna switching usage, a panel to be applied to the corresponding SRS resource set may be determined based on a UE implementation. For example, if a panel ID has not been configured for some (e.g., a subset) of SRS resource sets configured for antenna switching usage with respect to a UE, the UE may apply (or map) a panel to an SRS resource set for which the panel ID has not been configured depending on a UE implementation, and may perform SRS transmission through the corresponding panel. Alternatively, a specific rule on which a UE is configured to perform SRS transmission by mapping panels to an SRS resource set from a panel not allocated to the SRS resource set may be defined (or configured).

A UE may perform SRS transmission on an SRS resource set(s) for which a panel ID has been (explicitly) configured by using a corresponding panel ID. In contrast, a corresponding UE may be defined (and/or configured or indicated) to perform SRS transmission on an SRS resource set(s) for which a panel ID has not been configured by first mapping a panel ID among panel IDs other than a configured panel ID(s). Accordingly, there is an effect in that an SRS antenna switching and/or SRS panel switching operation of a panel unit can be performed. A base station may obtain state information of a DL channel based on the SRS antenna switching and/or SRS panel switching operation. For example, the UE may sequentially (or intersectionally) perform mapping between an SRS resource set and a panel ID from a non-configured (and/or non-allocated) panel ID. If all panel IDs supported by a corresponding UE has been mapped at least once, an operation of redundantly mapping an already mapped panel ID to an SRS resource set may be defined (and/or configured or indicated). There is a technical effect in that a UE can equally perform uplink transmission using a different panel(s) because a panel ID is equally allocated (or mapped).

In the aforementioned method, an antenna switching-related operation applied to one SRS resource set configured for antenna switching usage has been a prerequisite. That is, an antenna switching operation (e.g., 1 transmission (T)/2 reception (R), 1T/4R, 2T/4R) aimed at multiple SRS resources within one SRS resource set may be an operation in which a basic unit is based on one panel (e.g., UTE). When such a method is extended to multiple panels, the proposal method described in the present disclosure may be applied based on multiple SRS resource sets because multiple panel IDs are assigned.

For example, in relation to an antenna switching operation, in particular, in the case of a 1T/4R configuration and if numerology-related subcarrier spacing is large (e.g., 120 kHz), up to two guard symbols need to be configured. For this reason, there may be a case where all SRS resources for 1T/4R usage cannot be allocated within one slot. In order to prevent such a case, a case where two SRS resource sets need to be configured may occur. In the latter case, from a proposal operation viewpoint based on one SRS resource set (for antenna switching usage) corresponding to one panel, this may be treated as an exceptional case where corresponding two SRS resource sets are mapped to one panel. In this case, the two SRS resource sets may be for covering large subcarrier spacing and a large guard period (e.g., two symbols) from an antenna switching viewpoint.

The two SRS resource sets may be denoted as an SRS resource set group. For example, one panel ID may be configured for each SRS resource set group for antenna switching. Multiple SRS resource set groups may be configured. In this case, each of the SRS resource set groups may include one or more SRS resource sets. In this case, in the case of 1T/4R configured as large subcarrier spacing and/or a large guard period, the number of SRS resource sets constituting an SRS resource set group is set to 2. If not, the number of SRS resource sets constituting an SRS resource set group may be set to 1.

Furthermore, in at least one of Methods 1 to 4, a panel ID may be explicitly indicated through specific DCI or may be implicitly indicated (using higher layer signaling information, etc.) based on some information included in DCI.

First, methods of explicitly indicating a panel indicator related to uplink transmission are described.

For example, a specific field is defined separately from (or independently of an SRS resource indicator (SRI) field which may be present in DCI related to uplink transmission (hereinafter UL DCI). A panel ID may be configured and/or indicated using a corresponding specific field. For example, the specific field may be denoted as a panel-related field, a UTE field, etc., and may be used to indicate one or more panel IDs.

As a detailed example, if the specific field consists of two bits, the specific field may be configured and/or defined so that a "00" value (or state) indicates (or represents) a first panel (UTE #1), a "01" value indicates a second panel (UTE #2), a "10" value indicates the first panel and the second panel, and a "11" value indicates a third panel (UTE #3). Like the "10" value, a field value (or state) indicating multiple panel IDs may be present. A base station, etc. may configure and/or indicate the definition of such values (or states) through higher layer signaling (e.g., RRC signaling and/or MAC-CE signaling). Furthermore, if a value of a maximum number of panel IDs supported by a corresponding UE is reported in the form of UE capability information, codepoints of the specific field may be configured and/or generated in a specific combinatorial form based on corresponding reporting. For example, if a maximum number of panels supportable by a UE is X, the codepoints may be configured and/or defined so that a "00" value (or state) indicates a first panel (UTE #1), a "01" value indicates a second panel (UTE #2), . . . , a "11" value indicates an X-th panel (UTE #X). Even in this case, a field value (or state) indicating multiple panel IDs may be present.

As in the aforementioned example, if a separate field (e.g., a panel-related field or a UTE field) for indicating a panel ID is configured and/or indicated, a specific panel (e.g., UTE) of a UE may be indicated through the corresponding field. And/or a beam for PUSCH transmission usage may be indicated through an SRI field (or a UL-transmit configuration index (TCI) field), etc. along with the separate field. The corresponding beam may indicate a corresponding beam within the specific panel. For example, if a PUSCH transmission beam is indicated by an SRI field along with the aforementioned panel indication, a corresponding PUSCH transmission beam may be indicated in an SRS resource level or an UL-TCI state level indicating a specific reference signal (e.g., an uplink reference signal or a downlink reference signal). In this case, the corresponding PUSCH transmission beam may be indicated by (along with) an SRS resource(s) and/or an UL-TCI state(s) within an indicated panel.

Furthermore, the example has been described based on a case where the separate field consists of two bits, but the method may also be extended and applied to a case where a corresponding field consists of multiple bits.

For another example, a new field may be configured in an extension form in which an SRI field, etc. which may be present in DCI related to uplink transmission (hereinafter UL DCI) is interpreted again and deformed. The corresponding field maintains its name as an SRI field, but may be denoted as a new name (e.g., an UL TCI field). One or more panel IDs are indicated using the corresponding field, and simultaneously, a transmission beam(s) for (or associated) PUSCH transmission usage may be (together) indicated within a corresponding panel(s). For such panel indication and beam indication, the field may be defined, configured and/or indicated.

As a detailed example, if the field (i.e., a modified or re-interpreted SRI field or an UL TCI field) consists of 3 bits, the field may be configured and/or defined so that a "000" value (or state) indicates {first panel, third SRI}, a "001" value indicates {first panel, fifth SRI}, a "010" value indicates {second panel, fourth SRI}, a "011" value indicates {second panel, sixth SRI}, a "100" value indicates {first panel, third SRI} and {second panel, fourth SRI}, a "101" value indicates {first panel, fifth SRI} and {second panel, sixth SRI}, a "110" value indicates {first panel, second CSI-RS resource indicator (CRI)}, and a "111" value indicates {second panel, eighth synchronization signal block resource indicator (SSBRI)}. In this case, in the case of the "110" and "111" values, the UL TCI field, etc. may have been considered. A base station, etc. may configure and/or indicate the definition of such values (or states) through higher layer signaling (e.g., RRC signaling and/or MAC-CE signaling). Even in this case, a field value (or state) indicating multiple panel IDs may also be present.

Furthermore, if a value of a maximum number of panel IDs supported by a corresponding UE is reported in the form of UE capability information, codepoints of the specific field may be configured and/or generated in a specific combinatorial form based on the corresponding reporting. And/or if the number of SRS resources configured so that a transmission beam(s) for PUSCH usage is indicated like an SRI field, etc. is J, codepoints having a combination form may be configured and/or generated by being (additionally) interlocked with the J (e.g., J=2) value. Even in this case, a field value (or state) indicating multiple panel IDs may also be present. For example, if a maximum number of panels supportable by a UE is X, the field value (or state) may be configured and/or defined so that an "xx000" value (or state) indicates {first panel, first SRI}, an "xx001" value indicates {first panel, second SRI}, an "xx010" value indicates {second panel, first SRI}, . . . , an "xxxxx" value indicates an {(X−1)-th panel, first SRI}, an "xxxxx" value indicates an {(X−1)-th panel, second SRI}, an "xxxxx" value indicates an {X-th panel, first SRI}, and an "xxxxx" value indicates {X-th panel, the second SRI}.

As in the aforementioned example, if a field (e.g., a panel-related field, a UTE field, or an UL-TCI field) for indicating a panel ID is configured and/or indicated, a specific panel (e.g., UTE) of a UE may be indicated through the corresponding field. And/or a beam for PUSCH transmission usage may be indicated along with the field. The corresponding beam may indicate a corresponding beam within the specific panel. For example, if a PUSCH transmission beam is indicated along with the aforementioned panel indication, the corresponding PUSCH transmission beam may be indicated in an SRS resource level or an UL-TCI state level indicating a specific reference signal (e.g., an uplink reference signal, a downlink reference signal). In this case, the corresponding PUSCH transmission beam may be indicated by (along with) an SRS resource(s) and/or an UL-TCI state(s) within the indicated panel.

Furthermore, some of the examples have been described based on a case where the field consists of 3 bits, but the method may be extended and applied to a case where the corresponding field consists of multiple bits.

Next, a method of implicitly indicating a panel indicator related to uplink transmission is described. As described above, unlike a method of indicating a panel by using a method of a separate field or integrated field, a method of enabling a panel ID associated with uplink transmission to be recognized based on implicit indication may also be considered.

For example, upon scheduling of a PUSCH, a specific field (e.g., an SRI field or an UL-TCI field) may be indicated, and an SRS resource(s) to be applied to a beam determination for PUSCH transmission may be determined, configured and/or indicated. In this case, an operation of enabling a UE to interpret that a panel ID associated (or configured or indicated) with higher information including a corresponding SRS resource(s) has been implicitly indicated and uses (or applies) a panel according to the corresponding panel ID for PUSCH transmission may be defined (or configured or indicated). For example, the higher information may be an SRS resource set including one or more SRS resources.

And/or for example, in the case of a target SRS resource, a panel ID(s) (e.g., a UTE ID) may be additionally configured in spatial-related information (e.g., higher layer parameter spatialRelationInfo). For example, if a panel ID is configured as an index (e.g., ssb-Index) of a synchronization signal block (SSB) within spatial-related information, a UE may perform uplink transmission based on a target SRS resource by using the same as a spatial domain transmission filter (or beam) used to receive a reference SS/PBCH block indicated by the index of the SSB in a panel indicated by the corresponding panel ID. For example, if a panel ID is configured an index (e.g., csi-RS-Index) of a CSI-RS within spatial-related information, a UE may perform uplink transmission based on a target SRS resource by using the same as a spatial domain transmission filter (or beam) used to receive a reference CSI-RS indicated by the index of the CSI-RS in a panel indicated by the corresponding panel ID. For example, if a panel ID is configured an index of an SRS resource within spatial-related information, a UE may perform uplink transmission based on a target SRS resource by using the same as a spatial domain transmission filter (or beam) used to transmit a reference SRS indicated by the index of the SRS resource in a panel indicated by the corresponding panel ID.

Through the aforementioned proposal method, reference beam indication corresponding to each target SRS resource may be performed using reference RSs transmitted and received through a specific panel based on spatial-related information (e.g., spatial relation info) to which a panel ID may be additionally assigned (or configured). Accordingly, a panel- and/or beam-specific beam indication operation may be applied. There is an advantage in that a base station can control reference beam indication for each specific panel (e.g., UTE) of a UE through the corresponding operation. For example, if an indicated reference RS is a CSI-RS and/or SSB, a UE may receive indication for a reference beam to be applied to the uplink through a target SRS resource by using a specific panel ID (e.g., UTE ID) indicated together. In this case, the uplink through the target SRS resource may be performed through a transmission beam (Tx beam) corresponding to a reception beam (Rx beam) applied to the reception of a corresponding DL RS (e.g., a CSI-RS and/or an SSB). Alternatively, for example, if an indicated reference RS is an SRS, a UE may receive indication for a reference beam to be applied to the uplink through a target SRS resource by using a specific panel ID (e.g., UTE ID) indicated together. In this case, the uplink through the target SRS resource may be performed using a transmission beam applied to the transmission of the corresponding SRS.

In the aforementioned methods, the "operation based on a configuration of a panel ID for each SRS resource set for specific usage" may be a configuration/indication operation indicating that a UE should perform actual transmission through a corresponding interlocked panel (e.g., UTE) when performing uplink transmission through SRS resources within a corresponding SRS resource set. In contrast, an operation of configuring and/or indicating a panel ID associated with the aforementioned spatial-related information (e.g., spatialRelationInfo configuration parameter) may be an operation of configuring and/or indicating that a UE should obtain information on a reference beam from reference RSs transmitted and received using a corresponding interlocked panel when obtaining information related to a reference beam and apply the obtained information to determine a transmission beam of a target SRS resource as spatial relation beam indication information. That is, a mechanism by which a panel ID(s) (e.g., UTE ID(s)) is interlocked (and/or configured) for different purposes "transmission panel indication" and "panel indication to be applied when information on a reference beam is obtained" may be configured and/or indicated. Accordingly, there are effects in that the flexibility of a configuration related to a UE panel and beam indication can be increased, uplink (UL) transmission performance can be improved, and unintended uplink interference can be reduced.

Furthermore, the aforementioned proposal method based on the spatial-related information (e.g., higher layer parameter spatialRelationInfo) may also be extended and applied to an uplink data channel (e.g., PUSCH) and an uplink control channel (e.g., PUCCH). That is, a specific panel ID (e.g., UTE ID) may be configured (and/or interlocked or associated) with respect to spatial-related information (e.g., PUCCH-SpatialRelationInfo) for the transmission of a PUCCH. Table 9 illustrates an example of the aforementioned spatial-related information for the transmission of a PUCCH.

TABLE 9

PUCCH-SpatialRelationInfo information element
ASN1START
TAG-PUCCH-SPATIALRELATIONINFO-START
PUCCH-SpatialRelationInfo ::= SEQUENCE {
pucch-SpatialRelationInfoId PUCCH-SpatialRelationInfoId,
servingCellId ServCellIndex OPTIONAL, -- Need S
referenceSignal CHOICE {
ssb-Index SSB-Index,
csi-RS-Index NZP-CSI-RS-ResourceId,
srs SEQUENCE {
resource SRS-ResourceId,
uplinkBWP BWP-Id
}
},
pucch-PathlossReferenceRS-Id PUCCH-PathlossReferenceRS-Id,
p0-PUCCH-Id P0-PUCCH-Id,
closedLoopIndex ENUMERATED { i0, i1 }
}
PUCCH-SpatialRelationInfoId ::= INTEGER (1..maxNrofSpatialRelationInfos)

Referring to Table 9, similar to the spatial-related information for SRS usage, a parameter of spatial-related information for the transmission of a PUCCH may be configured as any one of {ssb-Index, csi-RS-Index, srs}.

If the aforementioned proposal methods are extended with respect to a PUCCH, the following may be obtained.

For example, in the case of a target PUCCH resource, a panel ID(s) (e.g., UTE ID) may be additionally configured in spatial-related information (e.g., higher layer parameter PUCCH-SpatialRelationInfo). For example, if a panel ID is configured as an index (e.g., ssb-Index) of a synchronization signal block (SSB) within spatial-related information, a UE may perform uplink transmission based on a target PUCCH resource by using the same as a spatial domain transmission filter (or beam) used to receive a reference SS/PBCH block indicated by the index of the SSB in a panel indicated by the corresponding panel ID. For example, if a panel ID is configured as an index of a CSI-RS (e.g., csi-RS-Index) within spatial-related information, a UE may perform uplink transmission based on a target PUCCH resource by using the same as a spatial domain transmission filter (or beam) used to receive a reference CSI-RS indicated by the index of the CSI-RS in a panel indicated by the corresponding panel ID. For example, if a panel ID is configured as an index of an SRS resource within spatial-related information, a UE may perform uplink transmission based on a target PUCCH resource by using the same as a spatial domain transmission filter (or beam) used to transmit a reference SRS indicated by the index of the SRS resource in a panel indicated by the corresponding panel ID.

And/or signaling that configures a panel ID(s) (e.g., UTE ID(s)) may be configured for each individual PUCCH resource as described above, but may be configured for each specific PUCCH resource group unit (e.g., for each PUCCH resource set, all PUCCH resources configured in a specific BWP, or all PUCCH resources configured in a specific CC).

That is, there is an advantage in that signaling overhead can be reduced by configuring and/or signaling a panel (e.g., UTE) in a form in which the panel is applied to multiple PUCCH resources in common. In particular, in the case of a specific type of PUCCH transmission (e.g., PUCCH transmission for (dynamic) HARQ ACK/NACK transmission usage), an exception (or separate) configuration operation for whether to perform corresponding transmission through which panel may also be defined. For example, in the case of a PUCCH for (dynamic) HARQ ACK/NACK transmission usage, an operation of enabling a UE to perform corresponding PUCCH transmission through a panel used to receive downlink data that has generated ACK/NACK may be separately (or independently) applied. Accordingly, there is an effect in that a downlink reception panel is applied to an uplink ACK/NACK transmission panel without any change.

Furthermore, in the aforementioned proposal methods, it may be seen that a method of applying a specific panel (e.g., UTE to downlink reception is based on the assumption that a corresponding panel is implicitly a panel which may be used for both uplink transmission and downlink reception. For example, a UE having a panel capable of performing transmission and reception simultaneously (or together) may perform the aforementioned proposal methods. In contrast, if a specific panel has been implemented for only downlink reception or only uplink transmission, a downlink reception entity (DRE) (and/or DRE ID) may need to be defined or configured in the aforementioned proposal methods. In this case, a spatial domain transmission filter (or beam) to be applied to uplink transmission may be the same as a spatial domain transmission filter used to receive a reference RS in a DRE indicated by a DRE ID. Accordingly, there is an effect in that an entity capable of reception can be configured and/or indicated for each downlink reception panel (e.g., DRE).

And/or for example, a linkage (or association relation) configuration between a DRE ID and a UTE ID may be separately provided. In the aforementioned proposal methods, a linkage configuration may also be applied. In the case of a UE capable of performing both transmission and reception using the same (physical) panel, the linkage configuration may mean the same panel.

And/or if specific "linkage between a UTE ID and a DRE ID" that is not precisely calibrated is configured (or indicated or applied), this corresponds to a case where the same transmission and reception panel is not used like a non-beam correspondence UE. In this case, there is an effect in that transmission and reception form a pair and can be controlled, configured or indicated. For example, a transmission panel(s) and a reception panel(s) are separated and implemented, but a specific reception panel closest to a specific transmission panel or having high correlation is interlocked in the above form, etc. Accordingly, an operation, such as that a specific downlink RS received through a corresponding interlocked reception panel is received, a reference beam is derived, and the derived reference beam is applied upon uplink transmission based on a corresponding interlocked transmission panel, may be applied. In contrast, when a base station determines a corresponding downlink beam based on specific uplink transmission (e.g., SRS) based on a corresponding interlocked transmission panel, a panel of a UE that receives the corresponding downlink beam may be indicated as an interlocked specific reception panel (e.g., a DRE ID).

And/or in order to support the aforementioned operation(s), a method of reporting, by a UE, a value measured using a reception panel (e.g., DRE ID) upon specific CSI reporting and/or beam reporting may be applied. In this case, an operation of transmitting an uplink channel, reported by the UE, through a corresponding transmission panel (e.g., a UTE ID) interlocked with the reception panel through the aforementioned linkage configuration (or interlocking relation) may be defined, configured and/or indicated.

UE capability information related to the aforementioned proposal method(s) may be configured and defined. Signaling for transmitting the UE capability information may be configured along with the aforementioned proposal method(s). For example, the UE capability information may include information on whether a transmission and reception panel(s) capable of performing both transmission and reception operation by using a single panel have been implemented in a UE, information on whether a UE is a UE in which a transmission panel and a reception panel are separated and/or information (e.g., number) related to a transmission panel and/or a reception panel, that is, candidates capable of being configured as a pair, etc.

For example, a UE may report the UE capability information to a base station. The UE may receive, from the base station, configuration and/or scheduling information for an uplink transmission-related operation based on at least one of the aforementioned proposal methods. In this case, the corresponding configuration and/or scheduling information may include information on a UE transmission and reception panel and/or a beam-related configuration, a panel ID (e.g., a UTE ID(s) or a DRE ID(s)). The UE may perform uplink transmission using a specific panel and/or beam based on the corresponding configuration and/or scheduling information. Likewise, the base station may receive the UE capability information from the UE. The base station may transmit, to the UE, configuration and/or scheduling information for an uplink transmission-related operation based on at least one of the aforementioned proposal methods. In this case, the corresponding configuration and/or scheduling information may include information on the UE transmission and reception panel and/or beam-related configuration, panel ID (e.g., a UTE ID(s) or a DRE ID(s)). The base station may receive an uplink channel and/or signal transmitted using a specific panel and/or beam based on the corresponding configuration and/or scheduling information.

Third Embodiment

Hereinafter, matters related to the operation of a multi-panel UE will be described.

A multi-panel UE (MPUE) may be classified as follows.

MPUE-Assumption 1: Multiple panels are implemented on a UE and only one panel can be activated at a time, with panel switching/activation delay of [X] ms.

MPUE-Assumption 2: Multiple panels are implemented on a UE and multiple panels can be activated at a time and one or more panels can be used for transmission).

MPUE-Assumption 3: Multiple panels are implemented on a UE and multiple panels can be activated at a time but only one panel can be used for transmission.

The MPUE-assumption is not limited to the above-described classification, and a generalized/modified MPUE assumption/category may be defined/classified/configured.

In relation to the operation of a UE based on at least one of the MPUE-assumptions as described above, methods according to the following proposals X1 and X2 may be considered.

Proposal X1 is related to the operation of a UE with beam correspondence and proposal X2 is related to the operation of a UE without beam correspondence.

[Proposal X1]

When UE beam correspondence holds without UL BM, the following operation/configuration of a base station/UE may be considered.

Method X1-1: (Beam reporting) A UE may report a panel ID when performing downlink beam reporting configured by the base station.

Method X1-2: (Beam indication) The panel ID may be included in a TCI state configuration for panel/beam indication.

[Proposal X2]

When UL BM is configured with at least one SRS resource set for BM, the following base station/UE operation/configuration may be considered.

Method X2-1: (Beam sweeping) SRS resource set ID for BM corresponds to a UE Tx panel, and the UE can perform Tx beam sweeping for different SRS resources within a BM SRS resource set (i.e., within the UE Tx panel).

Method X2-2: (Beam indication) When a spatial relation RS includes an SRS resource configured as an SRS resource set for the BM corresponding to the UE Tx panel, the UE may be configured to transmit a related target channel/signal through a beam related to the UE Tx panel and spatial relation.

Hereinafter, the operations of the UE/base station according to proposal X1 will be described in more detail.

[Proposal X1]

With respect to beam correspondence (BC), the UE/base station may operate as follows.

The UE may report, to the base station, UE capability information indicating that it can satisfy beam correspondence (BC) even if it does not perform an uplink beam management (UL BM) procedure.

Alternatively, the UE may report, to the base station, UE capability information indicating that operations based on beam correspondence to be described later are supported/implemented. The base station may set/instruct the corresponding UE to perform the following operations based on the report of the UE.

[Method X1-1]

The UE may also report a panel ID when performing downlink beam reporting. The panel ID may be based on a newly defined/configured ID. Hereinafter, it is referred to as "panel-ID (PID)" for convenience of description.

For the above operation, the base station may set/instruct to perform reporting accompanying the PID through a specific RRC parameter such as "reportQuantity" for a specific downlink (beam) reporting purpose. As an example, "reportQuantity" may be reported in the form of "CRI(+PID), L1-RSRP". As described above, the base station may define/set/instruct the UE to report which UE reception (Rx) panel (corresponding to or identical to a UE Tx panel) has measured a specific beam/CSI when the UE reports the specific beam/CSI.

Additionally, the base station may operate as follows when providing the above-described specific beam reporting related configuration. The base station may designate a specific UE Rx (Tx) panel in provision of a specific RS resource (e.g., CSI-RS, SSB, etc.) (to be measured) associated with the report (i.e., designate PID). The base station may set/instruct the UE to measure the corresponding RS resource with a designated Rx panel and report the result.

RS resource configuration/instruction accompanying a specific PID may be set for subsequent reporting from initial (beam) reporting or may be limitedly set only for the initial reporting.

For example, if a specific RS resource configuration/indication accompanying the PID is provided from the base station at the time when the UE performs initial (beam) reporting in an RRC connected state in a specific cell/BWP region, the UE may operate as follows.

If X (e.g., X=2) UE Rx (Tx) panels are (currently) enabled based on the UE capability information reported to the base station, the UE may map the actual Rx (/Tx) panel thereof for each X allocated/configured/indicated PID (independently/differently), measure the corresponding RS resource (with the mapped panel) and report the measured RS resource. The operation of the UE as described above may be set/instructed by the base station.

The number of enabled panels may correspond to the number of all panels (Rx(/Tx) panels) implemented in the corresponding UE. As another example, the number of enabled panels may correspond to some of all panels of the UE (i.e., the number of currently enabled panels). Information on the number of enabled panels and corresponding PID combinations may be reported (independently) by the UE or controlled/indicated by the base station.

The base station can determine which PID is used to measure the result by the initial (beam) reporting but cannot ascertain a panel of the UE which has been actually used for measurement. That is, mapping between each PID and a panel of the UE is performed gNB-transparently.

If RS resource configuration/indication accompanying a specific PID is defined/configured/indicated such that it is limitedly applied only to the initial (beam) reporting operation, the UE may operate as follows.

When performing subsequent beam reporting after the initial (beam) reporting, the UE may change the set/indicated PID to another PID/independently and perform reporting of corresponding reporting contents accompanying the PID. The operation of the UE may be configured/instructed by the base station. The subsequent beam reporting may be beam reporting configured periodically/semi-statically by the base station or beam reporting triggered according to an aperiodic reporting configuration.

Advantages of the above operation are as follows. Initial reporting is performed based on gNB-transparent panel-to-PID mapping, but (simultaneous) measurement of other panels may be allowed/instructed/configured for subsequent reporting. Therefore, a better/preferred panel than the PID indicated by the base station can be measured/determined in the subsequent reporting. Accordingly, the UE may change the PID and perform reporting.

In the above-described operation (or separately from the above-described operations), the base station may configure (e.g., RRC/MAC CE)/instruct (e.g., MAC CE) panels (and/or a combination of specific panels corresponding to the PID) used in a measurement and reporting contents derivation/calculation process to the UE for a specific RS (e.g., CSI-RS, SSB, etc.) related to DL (beam) reporting.

The UE may measure a configured/instructed RS (gNB-transmitting RS(s)) based on the configured/instructed panels (and/or a combination of specific panels corresponding to the PID) and report an optimal/preferred PID and/or a corresponding channel/beam quality parameter (e.g., L1-RSRP, L1-SINR, L1-RSRQ, CQI, and/or a function indicating a predefined/set channel/beam/strength). The corresponding operation may be set/instructed by the base station.

The base station may not specify a specific PID in the resource setting/configuration and may provide only configuration/instruction for the UE to report by giving the PID. As an example, the base station may provide configuration/instruction for the number of panels used for beam measurement and reporting. In this case, the UE may perform downlink (DL) reporting including the preferred PID based on the PID (per panel) set by the UE (even during initial reporting). The base station has the effect of utilizing/applying reporting per panel in subsequent beam indication.

In the above embodiments, initial (beam) reporting and subsequent (beam) reporting may be based on the following definitions.

Initial (beam) reporting may mean first reporting based on first associated RRC configuration.

Subsequent (beam) reporting is reporting performed after the initial beam reporting and may include reporting according to i) to iii) below.

i) Beam reporting after RRC reconfiguration is performed ii) Reporting performed after some parameters/configurations are partially selected/activated (down-selection/(partially) activation) or some configuration information is updated under the current RRC configuration by specific (related) MAC CE signaling, etc.

iii) Reporting performed after i) and/or ii)

[Method X1-2]

The ID of a panel may be included in TCI state configuration for panel/beam indication.

According to an embodiment, PID(s) configuration for beam indication may be applied to SSB (SSB/PBCH block) as follows. PID(s) configuration may be provided only for specific SSB index(es) included in resource configuration for "beam management" (within specific TCI (state(s)) configuration or in association with TCI (state(s)) configuration). The above limitation considers the fact that application of panel-specific measurement and reporting to other uses of the SSB (e.g., radio link monitoring (RLM), beam failure recovery (BFR), and/or radio resource management (RRM)) may cause performance instability or maintaining the conventional panel-transparent operation may be stable for system operation.

According to an embodiment, the PID configuration may be provided only for specific SSB index(es) included in resource configuration for beam management and/or resource configuration for "radio resource management (RRM)". In this case, the SSB for RRM is also linked with PID and thus RRM-related measurement and reporting is performed for each panel. Based on the corresponding reporting, the base station may check which panel is related to an RRM measurement value. Based on this, the base station may associate cell/TP (transmission point)/RP (reception point) for each PID. That is, according to the present embodiment, it is possible to obtain the effect of cell/TP/RP-splitting depending on a UE panel(s).

According to an embodiment, the PID configuration may be provided for specific SSB index(es) included in resource configuration for beam failure recovery (BFR). This is for the purpose of recovering beam failure for a specific panel even in the BFR process. For example, a specific Rx (Tx) panel of a UE that receives a specific control channel for BFR to be recovered (e.g., a control resource set (CORESET)) may be reported in the form of a preferred PID from the UE during the BFR process. Additionally or separately, the base station may set/instruct the UE to receive/detect the corresponding BFR-CORSET with a specific PID. Through the above operation, the beam failure recovery procedure can be performed panel-specifically.

An operation of applying PID(s) determined/applied based on the above embodiments as default panel ID(s) until it is updated and applied by additional UE-dedicated control signaling and/or related UE behavior may be defined/set/instructed. Specifically, the PID(s) may be applied to reception of specific (or all) downlink signals/channels (e.g., reception of PDCCH, PDSCH, SSB, TRS, and CSI-RS for BM/CSI (tracking)/DMRS/PTRS). In addition, the PID(s) may be applied to transmission of specific (or all) uplink signals/channels (e.g., transmission of PUSCH, PUCCH, SRS, and/or (P)RACH).

According to an embodiment, PID configuration may be provided for specific SSB index(es) included in resource configuration for radio link monitoring (RLM). This is for the purpose of recovering radio link failure for a specific panel even in the RLM process (that is, for the purpose of discovering a transmission/reception channel with high quality faster and more stably and entering an RRC connected state). For example, a specific Rx (Tx) panel of the UE may be reported in the form of a preferred PID from the UE in the RLM process. Additionally or separately, the UE that has entered an RRC connected state in association with a (new/updated/re-detected) cell/BWP may be defined/configured/instructed to report specific PID(s) used for association with the ((new/updated/re-detected) cell/BWP to the base station. The reporting operation may be performed based on a predefined/set time and/or a specific signaling format.

An operation of applying PID(s) determined/applied based on the above embodiment as default panel ID(s) until it is updated and applied by additional UE-dedicated control signaling and/or a related UE behavior may be defined/set/instructed. Specifically, the PID(s) may be applied to reception of specific (or all) DL signals/channels (e.g., reception of PDCCH, PDSCH, SSB, TRS, and CSI-RS for BM/CSI (tracking)/DMRS/PTRS). In addition, the PID(s) may be applied to transmission of specific (or all) uplink signals/channels (e.g., transmission of PUSCH, PUCCH, SRS, and/or (P)RACH).

According to an embodiment, the PID(s) configuration may be applied as follows in the case of CSI-RS. The PID configuration may be limited to being provided only for the CSI-RS for "beam management" (within a specific TCI (state(s)) configuration or in association with the TCI (state(s)) configuration).

This considers the fact that application of panel-specific measurement and reporting to other uses of the CSI-RS (e.g., for CSI acquisition, tracking as TRS, radio link monitoring (RLM), beam failure recovery (BFR), and/or radio resource management (RRM)) may cause performance instability or maintaining the conventional panel-transparent operation may be stable for system operation.

According to an embodiment, the PID configuration may be provided only for specific CSI-RS resource index(es) included in resource configuration for beam management and/or resource configuration for "radio resource management (RRM)". In this case, the CSI-RS for RRM is also PID associated so that RRM-related measurement and reporting is performed for each panel. Based on the corresponding reporting, the base station may check which panel is related to an RRM measurement value. Based on this, the base station may associate cell/TP (transmission point)/RP (reception point) for each PID. That is, according to the present embodiment, it is possible to obtain the effect of cell/TP/RP-splitting depending on a UE panel(s).

According to an embodiment, the PID configuration may be provided for specific CSI-RS resource index(es) included in resource configuration for beam failure recovery (BFR). This is for the purpose of recovering beam failure for a specific panel even in the BFR process. For example, a specific Rx (Tx) panel of the UE receiving a specific control channel for BFR to be recovered (e.g., a control resource set (CORESET)) may be reported in the form of a preferred PID from the UE during the BFR process. Additionally or separately, the base station may configure/instruct the UE to receive/detect the corresponding BFR-CORSET with a specific PID. Through the above operation, the beam failure recovery procedure can be performed panel-specifically.

An operation of applying PID(s) determined/applied based on the above embodiments as default panel ID(s) until it is updated and applied by additional UE-dedicated control signaling and/or related UE behavior may be defined/set/ instructed. Specifically, the PID(s) may be applied to reception of specific (or all) DL signals/channels (e.g., reception of PDCCH, PDSCH, SSB, TRS, and CSI-RS for BM/CSI (tracking)/DMRS/PTRS). In addition, the PID(s) may be applied to transmission of specific (or all) uplink signals/ channels (e.g., transmission of PUSCH, PUCCH, SRS, and/or (P)RACH).

According to an embodiment, PID configuration may be provided for specific CSI-RS resource index(s) included in resource configuration for radio link monitoring (RLM). This is for the purpose of recovering radio link failure for a specific panel even in the RLM process (that is, for the purpose of discovering a transmission/reception channel with high quality faster and more stably and entering an RRC connected state). For example, a specific Rx (Tx) panel of the UE may be reported in the form of a preferred PID from the UE in the RLM process. Additionally or separately, the UE that has entered an RRC connected state in association with a (new/updated/re-detected) cell/BWP may be defined/configured/instructed to report specific PID(s) used for association with the ((new/updated/re-detected) cell/ BWP to the base station. The reporting operation may be performed based on a predefined/set time and/or a specific signaling format.

An operation of applying PID(s) determined/applied based on the above embodiment as default panel ID(s) until it is updated and applied by additional UE-dedicated control signaling and/or a related UE behavior may be defined/set/ instructed. Specifically, the PID(s) may be applied to reception of specific (or all) DL signals/channels (e.g., reception of PDCCH, PDSCH, SSB, TRS, and CSI-RS for BM/CSI (tracking)/DMRS/PTRS). In addition, the PID(s) may be applied to transmission of specific (or all) uplink signals/ channels (e.g., transmission of PUSCH, PUCCH, SRS, and/or (P)RACH).

According to an embodiment, PID configuration may be provided for specific CSI-RS resource index(s) (e.g., configured/associated with TRS-Info) for tracking. This is for the purpose of performing an operation optimized for tracking with respect to a specific UE panel even when receiving a tracking RS mainly for time/frequency synchronization. Accordingly, TRS reception and utilization as a sync-source for a subsequent RS can be made faster and more stably. For example, a specific Rx (Tx) panel of the UE may be reported in the form of a preferred PID during TRS reception and time/frequency-sync tracking. Additionally or separately, an operation of reporting specific (state) information related to PID(s) used for the UE to receive CSI-RS (as TRS) for tracking and to acquire/maintain time/frequency-sync to the base station may be defined/configured/instructed. The reporting operation may be performed based on a predefined/set time and/or a specific signaling format.

An operation of applying PID(s) determined/applied based on the above embodiment as default panel ID(s) until it is updated and applied by additional UE-dedicated control signaling and/or a related UE behavior may be defined/set/ instructed. Specifically, the PID(s) may be applied to reception of specific (or all) DL signals/channels (e.g., reception of PDCCH, PDSCH, SSB, TRS, and CSI-RS for BM/CSI (tracking)/DMRS/PTRS). In addition, the PID(s) may be applied to transmission of specific (or all) uplink signals/ channels (e.g., transmission of PUSCH, PUCCH, SRS, and/or (P)RACH).

According to an embodiment, the PID configuration may be set/instructed for a specific control channel (e.g., CORESET)) (and/or a specific search space configuration) (within a specific TCI (state(s)) configuration or in association with TCI (state(s)) configuration).

More specifically, the PID configuration may be set/ instructed in the form of a reference configuration related to reception of a specific downlink reference signal (e.g., DL DMRS) associated with a corresponding control channel. The PID configuration is set/instructed in a form that is associated with a candidate value of a corresponding DMRS configuration related parameter and/or the existing parameters (e.g., DMRS type, CDM-group, # of symbols, and port/layer related configuration), and thus reception of the control channel can be performed PID-specifically.

According to an embodiment, the PID(s) may be scheduled/set/instructed for scheduling/configuration/instruction of a specific data channel (e.g., PDSCH) (within a specific TCI (state(s)) configuration or in association with TCI (state(s)) configuration).

More specifically, the PID may be set/instructed in the form of a reference configuration related to reception of a specific DL RS (e.g., DL DMRS for PDSCH) associated with the corresponding data channel (e.g., PDSCH) in association with state(s) of a specific field (e.g., TCI field) in specific DL grant DCI for scheduling the corresponding PDSCH (or directly set/instructed by a description in the corresponding state(s)). The PID is set/instructed in a form associated with a candidate value of a corresponding DMRS configuration parameter and/or existing parameters (e.g., DMRS type, CDM-group, # of symbols, and port/layer related configuration), and thus reception of the data channel can be performed PID specifically. In the case of the corresponding TCI field (state(s)) for configuring the data channel (e.g., PDSCH), candidate values/parameters/descriptions related to the TCI field (state(s)) are preset/ provided by RRC signaling and some thereof may be set/instructed/applied to be down-selected/activated by subsequent MAC CE signaling.

The UE may receive a downlink signal according to at least one of the above-described embodiments, and when subsequent uplink feedback/reporting is configured/instructed, may initiate uplink transmission according to the associated configuration/instruction operation. An uplink channel may be defined/set/instructed to be transmitted based on UE Tx panels related to a specific PID(s) applied to the corresponding downlink reception. The UE transmission panel may be exactly the same as or (partly) different from the UE Rx panel(s)) (based on the performance report) that was associated with the specific PID(s). In this case, the relationship between Rx panel(s) and corresponding Tx panel(s) may be reported to the base station in advance/ separately or confirmed/controlled by the base station.

An operation between a UE and a base station based on at least one of the aforementioned proposal X1 and proposal X2 will be described. The following operations will be described focusing on proposal X1/X2, but the other embodiment(s) described above may also be applied.

Step 1) The UE may transmit UE capability information to the base station. As an example, the UE may report UE capability information related to beam management to the base station based on the above-described methods (in particular, proposal X1 (method X1-1/X1-2), proposal X2 (method X2-1/X2-2), etc.).

Step 2) The UE may receive a configuration/indication related to PID based beam management from the BS. In this case, the configuration/indication may be transmitted through higher layer signaling (e.g., RRC, MAC-CE)/DCI. As an example, the configuration/indication may be set/instructed based on the above-described methods (in particular, proposal X1 (method X1-1/X1-2), proposal X2 (method X2-1/X2-2), etc.).

Step 3) The UE may receive a DL channel/signal from the base station based on the configuration/indication. As an example, a beam sweeping operation related to DL channel/signal reception may be performed based on the above-described methods (in particular, proposal X1 (method X1-1/X1-2), proposal X2 (method X2-)1/X2-2), etc.).

Step 4) The UE may determine panel(s)/beam(s) based on the DL channel/signal and perform UL transmission for feedback/reporting (with PID) of information related to the determined panel(s)/beam(s). As an example, in this case, panel(s)/beam(s) determination and uplink transmission may be performed based on the above-described methods (in particular, proposal X1 (method X1-1/X1-2), proposal X2 (method X2-1/X2-)2), etc.).

The above-described steps are not all essential and may be omitted or related operations may be added depending on the UE/base station implementation method.

In terms of implementation, the operations (e.g., PID-related operations based on at least one of proposals X1 and X2) of the base station/UE according to the above-described embodiments are may be processed by devices of FIGS. 16 to 20 (e.g., processors 102 and 202 of FIG. 17).

In addition, the operations (e.g., PID-related operations based on at least one of proposal X1 and proposal X2) of the base station/UE according to the above-described embodiment may be stored in a memory (e.g., 104 and 204 of FIG. 17) in the form of commands/program (e.g., instructions and executable code) for driving at least one processor (e.g., 102 and 102 of FIG. 17).

Hereinafter, a method for reporting channel state information to which the above-described embodiments are applied will be described in detail in terms of operation of a UE with reference to FIG. 14.

FIG. 14 is a flowchart for explaining a channel state information reporting method performed by a UE in a wireless communication system according to an embodiment of the present disclosure.

Referring to FIG. 14, a channel state information (CSI) reporting method performed by a UE in a wireless communication system according to an embodiment of the present disclosure may include a UE capability information transmission step S1410, a step S1420 of receiving configuration information related to channel state information reporting, a downlink reference signal reception step S1430, and a channel state information transmission step S1440.

In S1410, the UE transmits UE capability information related to a plurality of panels to a base station.

According to an embodiment, the UE capability information may include information related to beam correspondence. The information related to beam correspondence may be related to at least one of whether the beam correspondence is established or an operation related to the beam correspondence. The UE capability information may be based on the method X1-1 of the proposal X1.

The operation of the UE (100/200 in FIGS. 16 to 20) to transmit the UE capability information related to a plurality of panels to the base station (100/200 in FIGS. 16 to 20) according to S1410 may be implemented by the devices of FIGS. 16 to 20. For example, referring to FIG. 17, one or more processors 102 may control one or more transceivers 106 and/or one or more memories 104 to transmit the UE capability information related to a plurality of panels to the base station 200.

In S1420, the UE receives configuration information related to reporting of CSI from the base station.

According to an embodiment, the configuration information may include information for at least one of at least one DL RS resource or a panel ID related to the DL RS resource. The configuration information may be based on the method X1-1 of the proposal X1. The specific panel may be based on any one of panel IDs mapped to the plurality of panels.

The operation of the UE (100/200 in FIGS. 16 to 20) to receive the configuration information related to reporting of the CSI from the base station (100/200 in FIGS. 16 to 20) according to the above-described S1420 may be implemented by the devices of FIGS. 16 to 20. For example, referring to FIG. 17, one or more processors 102 may control one or more transceivers 106 and/or one or more memories 104 to receive the configuration information related to reporting of CSI from the base station 200.

In S1430, the UE receives a downlink reference signal (DL RS) from the base station based on the configuration information. The DL RS may include a channel state information-reference signal (CSI-RS) or a synchronization signal block (SSB).

The operation of the UE (100/200 in FIGS. 16 to 20) to receive the DL RS from the base station (100/200 in FIGS. 16 to 20) based on the configuration information according to S1430 described above may be implemented by the devices of FIGS. 16 to 20. For example, referring to FIG. 17, one or more processors 102 may control one or more transceivers 106 and/or one or more memories 104 to receive the DL RS based on the configuration information from the base station 200.

In S1440, the UE transmits CSI related to a measurement result for the DL RS to the base station.

According to an embodiment, the measurement result for the DL RS may be based on at least one specific panel among the plurality of panels. The CSI may include information indicating the at least one specific panel.

According to an embodiment, the CSI may include a panel ID related to the specific panel. The panel ID may be based on a panel ID included in the configuration information or a panel ID excluded from the configuration information.

Based on that the CSI is related to initial reporting, the panel ID included in the CSI may be based on the panel ID included in the configuration information.

Based on the CSI related to subsequent reporting, the panel ID included in the CSI may be based on the panel ID included in the configuration information or the panel ID excluded from the configuration information. The panel ID excluded from the configuration information may be based on any one of panel IDs mapped to the plurality of panels.

The subsequent report may be related to at least one of reporting after the initial reporting, update of the configuration information through MAC-CE (Medium Access Control-Control Element) signaling, and RRC-reconfiguration.

The operation of the UE (100/200 in FIGS. 16 to 20) to transmit the CSI related to the measurement result for the DL RS to the base station (100/200 in FIGS. 16 to 20) according to the above-described S1440 may be implemented by the devices of FIGS. 16 to 20. For example, referring to FIG. 17, one or more processors 102 may control one or more transceivers 106 and/or one or more memories 104 to transmit the CSI related to the measurement result for the DL RS to the base station 200.

The method according to the present embodiment may further include an operation related to transmission of a downlink signal based on the CSI based on the method X1-2 of the proposal X1. Specifically, the method may further include a step of receiving information related to a transmission configuration indicator (TCI) and a step of receiving a downlink signal based on the information related to the TCI.

In the step of receiving the information related to the TCI, the UE receives the information related to the TCI from the base station.

According to an embodiment, the information related to the TCI may be related to the channel state information. The information related to the TCI may include panel information related to reception of the downlink signal. The panel information may be based on the channel state information.

The operation of the UE (100/200 in FIGS. 16 to 20) to receive the information related to the TCI from the base station (100/200 in FIGS. 16 to 20) according to the above-described steps may be implemented by the devices of FIG. 16 to FIG. 20. For example, referring to FIG. 17, one or more processors 102 may control one or more transceivers 106 and/or one or more memories 104 to receive the information related to the TCI from the base station 200.

In the step of receiving the downlink signal, the UE receives the downlink signal based on the TCI-related information from the base station.

According to an embodiment, the downlink signal may include an SS block, a channel state information reference signal (CSI-RS), a physical downlink control channel (PDCCH) or a physical downlink shared channel (PDSCH). The downlink signal may be related to at least one of radio resource management (RRM), radio link monitoring (RLM), beam failure recovery (BFR), and tracking for time frequency synchronization.

The panel information may be related to a demodulation reference signal (DMRS) of the PDCCH or the PDSCH.

The operation of the UE (100/200 in FIGS. 16 to 20) to receive a downlink signal based on the TCI-related information from the base station (100/200 in FIGS. 16 to 20) according to the above-described steps may be implemented by the devices of FIGS. 16 to 20. For example, referring to FIG. 17, one or more processors 102 may control one or more transceivers 106 and/or one or more memories 104 to receive the downlink signal based on the information related to the TCI from the base station 200.

Hereinafter, a beam management method to which the above-described embodiments are applied will be described in detail in terms of operation of the base station with reference to FIG. 15.

FIG. 15 is a flowchart for explaining a channel state information reporting method performed by a base station in a wireless communication system according to another embodiment of the present disclosure.

Referring to FIG. 15, the channel state information (CSI) reporting method performed by a base station in a wireless communication system according to another embodiment of the present disclosure may include a UE capability information reception S1510, a step S1520 of transmitting configuration information related to reporting of channel state information, a downlink reference signal transmission step (S1530), and a channel state information reception step (S1540).

In S1510, the base station receives UE capability information related to the plurality of panels from a UE.

According to an embodiment, the UE capability information may include information related to beam correspondence. The information related to beam correspondence may be related to at least one of whether the beam correspondence is established or an operation related to the beam correspondence. The UE capability information may be based on the method 1 of the proposal X1.

The operation of the base station (100/200 in FIGS. 16 to 20) to receive the UE capability information related to a plurality of panels from the UE (100/200 in FIGS. 16 to 20) according to S1510 may be implemented by the devices of FIGS. 16 to 20. For example, referring to FIG. 17, one or more processors 202 may control one or more transceivers 206 and/or one or memories 204 to receive the UE capability information related to a plurality of panels from the UE 100.

In S1520, the base station transmits configuration information related to reporting of CSI to the UE.

According to an embodiment, the configuration information may include information for at least one of at least one DL RS resource or a panel ID related to the DL RS resource. The configuration information may be based on the method X1-1 of the proposal X1. The specific panel may be based on any one of panel IDs mapped to the plurality of panels.

The operation of the base station (100/200 in FIGS. 16 to 20) to transmit the configuration information related to reporting of CSI to the UE (100/200 in FIGS. 16 to 20) according to S1520 may be implemented by the devices of FIGS. 16 to 20. For example, referring to FIG. 17, one or more processors 202 may control one or more transceivers 206 and/or one or memories 204 to transmit the configuration information related to reporting of CSI to the UE 100.

In S1530, the base station transmits a downlink reference signal (DL RS) based on the configuration information to the UE. The DL RS may include a channel state information-reference signal (CSI-RS) or a synchronization signal block (SSB).

The operation of the base station (100/200 in FIGS. 16 to 20) to transmit the downlink reference signal based on the configuration information to the UE (100/200 in FIGS. 16 to 20) according to S1530 described above may be implemented by the devices of FIGS. 16 to 20. For example, referring to FIG. 17, one or more processors 202 may control one or more transceivers 206 and one or more memories 204 to transmit the DL RS based on the configuration information to the UE 100.

In S1540, the base station receives CSI related to a measurement result for the DL RS from the UE.

According to an embodiment, the measurement result for the DL RS may be based on at least one specific panel among the plurality of panels. The CSI may include information indicating the at least one specific panel.

According to an embodiment, the CSI may include a panel ID related to the specific panel. The panel ID may be based on a panel ID included in the configuration information or a panel ID excluded from the configuration information.

Based on that the CSI is related to initial reporting, the panel ID included in the CSI may be based on the panel ID included in the configuration information.

Based on the CSI related to subsequent reporting, the panel ID included in the CSI may be based on the panel ID included in the configuration information or the panel ID excluded from the configuration information. The panel ID excluded from the configuration information may be based on any one of panel IDs mapped to the plurality of panels.

The subsequent report may be related to at least one of reporting after the initial reporting, update of the configuration information through MAC-CE (Medium Access Control-Control Element) signaling, and RRC-reconfiguration.

The operation of the base station (100/200 in FIGS. 16 to 20) to receive the CSI related to the measurement result for the DL RS from the UE (100/200 in FIGS. 16 to 20) according to the above-described S1540 may be implemented by the devices of FIGS. 16 to 20. For example, referring to FIG. 17, one or more processors 202 may control one or more transceivers 206 and/or one or more memories 204 to receive the CSI related to the measurement result for the DL RS from the UE 100.

The method according to the present embodiment may further include an operation related to transmission of a downlink signal based on the CSI based on the method X1-2 of the proposal X1. Specifically, the method may further include a step of transmitting information related to a transmission configuration indicator (TCI) and a step of transmitting a downlink signal based on the information related to the TCI.

In the step of transmitting the information related to the TCI, the base station transmits the information related to the TCI to the UE.

According to an embodiment, the information related to the TCI may be related to the channel state information. The information related to the TCI may include panel information related to transmission of the downlink signal. The panel information may be based on the channel state information.

The operation of the base station (100/200 in FIGS. 16 to 20) to transmit the information related to the TCI to the UE (100/200 in FIGS. 16 to 20) according to the above-described steps may be implemented by the devices of FIG. 16 to FIG. 20. For example, referring to FIG. 17, one or more processors 202 may control one or more transceivers 206 and/or one or more memories 204 to transmit the information related to the TCI to the UE 100.

In the step of transmitting the downlink signal, the base station transmits the downlink signal based on the TCI-related information to the UE.

According to an embodiment, the downlink signal may include an SS block, a channel state information reference signal (CSI-RS), a physical downlink control channel (PDCCH) or a physical downlink shared channel (PDSCH).

The downlink signal may be related to at least one of radio resource management (RRM), radio link monitoring (RLM), beam failure recovery (BFR), and tracking for time frequency synchronization.

The panel information may be related to a demodulation reference signal (DMRS) of the PDCCH or the PDSCH.

The operation of the base station (100/200 in FIGS. 16 to 20) to transmit the downlink signal based on the TCI-related information to the UE (100/200 in FIGS. 16 to 20) according to the above-described steps may be implemented by the devices of FIGS. 16 to 20. For example, referring to FIG. 17, one or more processors 202 may control one or more transceivers 206 and/or one or more memories 204 to transmit the downlink signal based on the information related to the TCI to the UE 100.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 16 illustrates a communication system 1 applied to the present disclosure.

Referring to FIG. 16, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a B S/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure.

FIG. 17 illustrates wireless devices applicable to the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 18 illustrates a signal process circuit for a transmission signal.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 19 illustrates another example of a wireless device applied to the present disclosure.

The wireless device may be implemented in various forms according to a use-case/service (refer to FIG. 16). Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 20 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

The advantages of the method and apparatus for reporting channel state information in a wireless communication system according to an embodiment of the present disclosure will be described below.

According to an embodiment of the present disclosure, reporting of channel state information is performed based on UE capability information related to beam correspondence. The CSI includes information indicating at least one specific panel among a plurality of panels of a UE. Therefore, beam reporting of a multi-panel UE can be performed in a panel-specific manner.

According to an embodiment of the present disclosure, the CSI includes any one of panel IDs mapped to the plurality of panels. Specifically, the panel ID included in the CSI may be based on a panel ID included in configuration information related to reporting of the CSI or a panel ID excluded from the configuration information. Since the panel included in the CSI is not limited to a panel according to configuration/indication of a base station, a more optimal panel can be reported according to the channel state.

According to an embodiment of the present disclosure, transmission of a downlink signal based on the CSI may be performed. Specifically, the downlink transmission is performed based on information related to a transmission configuration indicator (TCI). The information related to the TCI is related to the CSI and includes panel information related to reception of the downlink signal. Accordingly, procedures related to the downlink signal (e.g., radio resource management (RRM), radio link monitoring (RLM), beam failure recovery (BFR) and time-frequency synchronization for tracking) is performed in a panel specific manner. Therefore, the procedures related to the downlink signal can be performed more rapidly and stably.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method for reporting channel state information (CSI) performed by a UE in a wireless communication system, the method comprising:
transmitting UE capability information related to a plurality of panels;
receiving configuration information related to reporting of CSI related to multiple first panels among the plurality of panels;
receiving a downlink reference signal (DL RS) based on the configuration information;
performing measurements for the DL RS based on the multiple first panels and at least one second panel other than the multiple first panels among the plurality of panels; and
transmitting CSI related to a measurement result for the DL RS,
wherein, based on at least one second measurement result based on the at least one second panel being better than first measurement results based on the multiple first panels, the measurement result for the DL RS is based on the at least one second panel among the plurality of panels, and the CSI includes information indicating the at least one second panel.

2. The method of claim 1, wherein the UE capability information includes information related to beam correspondence.

3. The method of claim 2, wherein the information related to the beam correspondence is related to at least one of whether the beam correspondence is established or an operation related to the beam correspondence.

4. The method of claim 1, wherein the configuration information includes information for at least one of at least one DL RS resource or a panel ID related to the DL RS resource.

5. The method of claim 1, wherein the subsequent reporting is related to at least one of reporting after the initial report, update of the configuration information through medium access control-control element (MAC-CE) signaling, or RRC reconfiguration.

6. The method of claim 1, further comprising:
receiving information related to a transmission configuration indicator (TCI); and
receiving a downlink signal based on the information related to the TCI,
wherein the information related to the TCI is related to the channel state information.

7. The method of claim 6, wherein the information related to the TCI includes panel information related to reception of the downlink signal.

8. The method of claim 7, wherein the downlink signal includes an SS block, a channel state information reference signal (CSI-RS), a physical downlink control channel (PDCCH) or a physical downlink shared channel (PDSCH).

9. The method of claim 8, wherein the downlink signal is related to at least one of radio resource management (RRM), radio link monitoring (RLM), beam failure recovery (BFR), or tracking for time-frequency synchronization.

10. The method of claim 8, wherein the panel information is related to a demodulation reference signal (DMRS) of the PDCCH or the PDSCH.

11. A UE reporting channel state information (CSI) in a wireless communication system, comprising:
one or more transceivers;
one or more processors; and
one or more memories operatively connectable to the one or more processors and storing instructions for performing operations when reporting of CSI is executed by the one or more processors,
wherein the operations include:
transmitting UE capability information related to a plurality of panels;
receiving configuration information related to reporting of CSI related to multiple first panels among the plurality of panels;
receiving a downlink reference signal (DL RS) based on the configuration information;
performing measurements for the DL RS based on the multiple first panels and at least one second panel other than the multiple first panels among the plurality of panels; and
transmitting CSI related to a measurement result for the DL RS,
wherein, based on at least one second measurement result based on the at least one second panel being better than first measurement results based on the multiple first panels, the measurement result for the DL RS is based on the at least one second panel among the plurality of panels, and the CSI includes information indicating the at least one second panel.

12. A method for reporting channel state information (CSI) performed by a base station in a wireless communication system, the method comprising:
receiving UE capability information related to a plurality of panels;
transmitting configuration information related to reporting of CSI related to multiple first panels among the plurality of panels;
transmitting a downlink reference signal (DL RS) based on the configuration information; and
receiving CSI related to a measurement result for the DL RS,
wherein, based on at least one second measurement result based on the at least one second panel being better than first measurement results based on the multiple first panels, the measurement result for the DL RS is based on the at least one second panel among the plurality of panels, and the CSI includes information indicating the at least one second panel.

* * * * *